US009429435B2

(12) United States Patent
Blumenberg et al.

(10) Patent No.: US 9,429,435 B2
(45) Date of Patent: Aug. 30, 2016

(54) INTERACTIVE MAP

(71) Applicant: Apple Inc., Cupertino, CA (US)

(72) Inventors: Christopher Blumenberg, San Francisco, CA (US); Jaron I. Waldman, Palo Alto, CA (US); Marcel van Os, San Francisco, CA (US); Richard J. Williamson, Los Gatos, CA (US)

(73) Assignee: APPLE INC., Cupertino, CA (US)

( * ) Notice: Subject to any disclaimer, the term of this patent is extended or adjusted under 35 U.S.C. 154(b) by 228 days.

(21) Appl. No.: 13/907,837

(22) Filed: May 31, 2013

(65) Prior Publication Data

US 2013/0339891 A1      Dec. 19, 2013

Related U.S. Application Data

(60) Provisional application No. 61/655,792, filed on Jun. 5, 2012.

(51) Int. Cl.
*G06F 3/0482* (2013.01)
*G01C 21/26* (2006.01)
(Continued)

(52) U.S. Cl.
CPC ............ *G01C 21/26* (2013.01); *G01C 21/3614* (2013.01); *G01C 21/3664* (2013.01); *G01C 21/3682* (2013.01); *G01C 21/3694* (2013.01);
(Continued)

(58) Field of Classification Search
CPC .......................... G06F 3/04842; G06F 3/0482
USPC .......................................................... 715/771
See application file for complete search history.

(56) References Cited

U.S. PATENT DOCUMENTS

| 4,914,605 A | 4/1990 | Loughmiller, Jr. et al. |
| 5,289,572 A | 2/1994 | Yano et al. |

(Continued)

FOREIGN PATENT DOCUMENTS

| EP | 1102037 | 5/2001 |
| EP | 1995564 | 11/2008 |

(Continued)

OTHER PUBLICATIONS

Author Unknown, "Android 2.3.4 User's Guide", May 20, 2011, pp. 1-384, Google, Inc.

(Continued)

*Primary Examiner* — Reza Nabi
*Assistant Examiner* — Daniel Rodriguez
(74) *Attorney, Agent, or Firm* — Morgan, Lewis & Bockius LLP

(57) ABSTRACT

An interactive capability enables a user to dynamically adjust the content of an electronic map. Different modes can be chosen to emphasize features relevant to a particular interest, e.g. commuting, tourism, weather, etc. Combinations of modes can be selected to create a customized map. When a search is conducted, the chosen mode functions as a filter for the retrieved results. The map responds to user input directed to a given feature, to display information relevant to that feature. Tapping or clicking on a highway displays the locations of services along the highway. Touching two points on the map causes available routes between them to be computed and displayed to the user, along with relevant data for each route. Geospatial applications can be integrated with the map to provide information pertaining to the area displayed on the map, and to refine search results to those that are relevant to the area.

25 Claims, 15 Drawing Sheets

(51) Int. Cl.
*G06F 3/0484* (2013.01)
*G01C 21/36* (2006.01)
*G06F 17/30* (2006.01)
*G09B 29/00* (2006.01)

(52) U.S. Cl.
CPC ......... *G06F 3/0482* (2013.01); *G06F 3/04842* (2013.01); *G06F 17/3087* (2013.01); *G09B 29/007* (2013.01)

(56) References Cited

U.S. PATENT DOCUMENTS

| | | | |
|---|---|---|---|
| 5,878,368 A | 3/1999 | DeGraaf | |
| 6,028,600 A * | 2/2000 | Rosin | H04N 5/44543 348/38 |
| 6,072,483 A * | 6/2000 | Rosin | G06F 17/30873 348/E5.002 |
| 6,092,076 A * | 7/2000 | McDonough | G01C 21/3667 |
| 6,107,961 A | 8/2000 | Takagi | |
| 6,163,269 A | 12/2000 | Millington et al. | |
| 6,195,692 B1 * | 2/2001 | Hsu | H04N 5/44543 348/565 |
| 6,260,192 B1 * | 7/2001 | Rosin | H04N 5/44543 348/E5.002 |
| 6,307,573 B1 * | 10/2001 | Barros | G06F 17/30241 345/440 |
| 6,321,158 B1 | 11/2001 | DeLorme et al. | |
| 6,321,161 B1 | 11/2001 | Herbst et al. | |
| 6,374,180 B1 | 4/2002 | Slominski et al. | |
| 6,396,475 B1 | 5/2002 | Ellenby et al. | |
| 6,397,387 B1 * | 5/2002 | Rosin | H04N 5/44543 348/E5.002 |
| 6,434,482 B1 | 8/2002 | Oshida et al. | |
| 6,526,335 B1 | 2/2003 | Treyz et al. | |
| 6,587,784 B1 | 7/2003 | Okude et al. | |
| 6,633,312 B1 * | 10/2003 | Rochford | H04L 43/0817 709/223 |
| 6,650,326 B1 * | 11/2003 | Huber et al. | 345/428 |
| 6,792,349 B1 | 9/2004 | Chen et al. | |
| 7,379,811 B2 | 5/2008 | Rasmussen et al. | |
| 7,433,780 B2 | 10/2008 | Machino | |
| 7,706,973 B2 | 4/2010 | McBride et al. | |
| 7,831,433 B1 | 11/2010 | Belvin et al. | |
| 7,860,645 B2 | 12/2010 | Kim et al. | |
| 7,933,395 B1 | 4/2011 | Bailly et al. | |
| 8,314,790 B1 * | 11/2012 | Zeiger | G06T 13/00 345/419 |
| 8,355,862 B2 | 1/2013 | Matas et al. | |
| 8,364,398 B2 | 1/2013 | Rossio et al. | |
| 8,370,060 B2 | 2/2013 | Rossio et al. | |
| 8,464,182 B2 | 6/2013 | Blumenberg et al. | |
| 8,489,641 B1 * | 7/2013 | Seefeld et al. | 707/792 |
| 8,589,069 B1 | 11/2013 | Lehman | |
| 8,606,516 B2 | 12/2013 | Vertelney et al. | |
| 8,607,167 B2 | 12/2013 | Matas et al. | |
| 8,639,654 B2 | 1/2014 | Vervaet et al. | |
| 8,798,918 B2 | 8/2014 | Onishi et al. | |
| 9,164,666 B2 * | 10/2015 | Felt | G06F 19/322 |
| 2001/0056325 A1 | 12/2001 | Pu et al. | |
| 2002/0078467 A1 * | 6/2002 | Rosin | H04N 5/44543 725/110 |
| 2002/0103599 A1 | 8/2002 | Sugiyama et al. | |
| 2002/0149602 A1 * | 10/2002 | Redpath | G06T 11/20 345/629 |
| 2003/0028317 A1 * | 2/2003 | Nagamune | 701/208 |
| 2004/0066316 A1 * | 4/2004 | Ogawa | G01C 21/32 340/995.1 |
| 2004/0088392 A1 * | 5/2004 | Barrett | G06F 17/5009 709/223 |
| 2004/0117358 A1 * | 6/2004 | von Kaenel | G06F 17/30241 |
| 2004/0128066 A1 | 7/2004 | Kudo et al. | |
| 2005/0125148 A1 | 6/2005 | Van Buer et al. | |
| 2005/0154627 A1 * | 7/2005 | Zuzek | G06Q 30/02 705/2 |
| 2005/0179684 A1 * | 8/2005 | Wallace | G06T 11/206 345/419 |
| 2005/0222760 A1 | 10/2005 | Cabral et al. | |
| 2005/0231392 A1 * | 10/2005 | Meehan | G09B 29/007 340/995.1 |
| 2005/0240381 A1 * | 10/2005 | Seiler | G06F 17/5009 703/1 |
| 2005/0243104 A1 | 11/2005 | Kinghorn | |
| 2006/0026084 A1 * | 2/2006 | Bonham et al. | 705/35 |
| 2006/0059143 A1 * | 3/2006 | Palmon | G06F 17/30286 |
| 2006/0174209 A1 * | 8/2006 | Barros | G06F 3/0483 715/764 |
| 2007/0067739 A1 * | 3/2007 | Atarashi | G01C 21/26 715/818 |
| 2007/0088897 A1 | 4/2007 | Wailes et al. | |
| 2007/0282663 A1 * | 12/2007 | Barlament | G06Q 10/10 705/300 |
| 2008/0041948 A1 * | 2/2008 | Mayers | G06Q 10/08 235/385 |
| 2008/0059889 A1 * | 3/2008 | Parker | G06F 17/30241 715/748 |
| 2008/0238941 A1 | 10/2008 | Kinnan et al. | |
| 2008/0262714 A1 * | 10/2008 | Abramovich Ettinger | G01C 21/00 701/533 |
| 2008/0262717 A1 * | 10/2008 | Ettinger | G01C 21/3476 701/467 |
| 2009/0005981 A1 | 1/2009 | Forstall et al. | |
| 2009/0027418 A1 * | 1/2009 | Maru | G06F 17/30241 345/629 |
| 2009/0051698 A1 * | 2/2009 | Boose | G06F 17/30271 345/619 |
| 2009/0051702 A1 * | 2/2009 | Morbey | G09B 29/10 345/629 |
| 2009/0100037 A1 * | 4/2009 | Scheibe | 707/5 |
| 2009/0160873 A1 * | 6/2009 | Kew | G06Q 10/00 345/629 |
| 2009/0183083 A1 * | 7/2009 | Hedges | G06F 3/04817 715/738 |
| 2009/0198767 A1 | 8/2009 | Jakobson et al. | |
| 2009/0204928 A1 * | 8/2009 | Kallio et al. | 715/799 |
| 2009/0216341 A1 * | 8/2009 | Enkerud | G05B 19/042 700/17 |
| 2009/0262071 A1 * | 10/2009 | Yoshida | G01C 21/3614 345/157 |
| 2009/0327078 A1 * | 12/2009 | Ohazama et al. | 705/14.54 |
| 2010/0004852 A1 | 1/2010 | Kawamura | |
| 2010/0017733 A1 * | 1/2010 | Barros | G06F 17/30241 715/766 |
| 2010/0023255 A1 * | 1/2010 | Nambata | G01C 21/3635 701/533 |
| 2010/0042315 A1 * | 2/2010 | Ikeuchi | G01C 21/32 701/532 |
| 2010/0070253 A1 | 3/2010 | Hirata et al. | |
| 2010/0088627 A1 * | 4/2010 | Enkerud | G06F 9/443 715/777 |
| 2010/0104174 A1 | 4/2010 | Rohlf et al. | |
| 2010/0131903 A1 * | 5/2010 | Thomson | G06F 8/38 715/847 |
| 2010/0198507 A1 * | 8/2010 | Lo | 701/209 |
| 2011/0016427 A1 * | 1/2011 | Douen | G06F 19/324 715/828 |
| 2011/0060983 A1 * | 3/2011 | Cai | G06F 17/30884 715/254 |
| 2011/0077852 A1 | 3/2011 | Ragavan et al. | |
| 2011/0153368 A1 * | 6/2011 | Pierre | G06Q 10/067 705/4 |
| 2011/0173229 A1 | 7/2011 | Choudhury et al. | |
| 2011/0179389 A1 * | 7/2011 | Douen | G09B 23/28 715/843 |
| 2011/0196610 A1 | 8/2011 | Waldman et al. | |
| 2011/0291860 A1 | 12/2011 | Ozaki et al. | |
| 2012/0016577 A1 | 1/2012 | Kim et al. | |
| 2012/0019513 A1 | 1/2012 | Fong et al. | |
| 2012/0022876 A1 * | 1/2012 | Lebeau | G01C 21/265 704/275 |
| 2012/0089920 A1 * | 4/2012 | Eick | 715/739 |
| 2012/0109509 A1 | 5/2012 | Nesbitt et al. | |
| 2012/0253659 A1 | 10/2012 | Pu et al. | |

(56) References Cited

U.S. PATENT DOCUMENTS

| | | | | |
|---|---|---|---|---|
| 2012/0271848 | A1* | 10/2012 | Kadowaki | G06F 17/30241 707/769 |
| 2012/0278752 | A1* | 11/2012 | Parker | G06F 3/0488 715/780 |
| 2013/0038525 | A1* | 2/2013 | Hakegard | G01C 23/00 345/156 |
| 2013/0218890 | A1* | 8/2013 | Fernandes | G06Q 50/163 707/736 |

FOREIGN PATENT DOCUMENTS

| | | |
|---|---|---|
| EP | 2 075 543 A2 | 7/2009 |
| EP | 2 213 983 A2 | 8/2010 |
| EP | 2672225 | 12/2013 |
| EP | 2672226 | 12/2013 |
| JP | 2007-057857 | 3/2007 |
| WO | WO 2007/115221 A2 | 10/2007 |
| WO | WO 2011/141980 A1 | 11/2011 |
| WO | WO 2011/146141 | 11/2011 |
| WO | WO 2012/034581 | 3/2012 |
| WO | WO 2013/184348 | 12/2013 |
| WO | WO 2013/184444 | 12/2013 |
| WO | WO 2013/184449 | 12/2013 |
| WO | WO 2013/184528 | 12/2013 |

OTHER PUBLICATIONS

Author Unknown, "Garmin. nüvi 1100/1200/1300/1400 series owner's manual," Jan. 2011, 72 pages, Garmin Corporation, No. 68, Jangshu 2nd Road, Sijhih, Taipei County, Taiwan.

Author Unknown, "Google Maps Voice Navigation in Singapore," software2tech, Jul. 20, 2011, 1 page, available at http://www.youtube.com/watch?v=7B9JN7BkvME.

Author Unknown, "'Touch & Go' Owner's Manual," Jul. 2011, 218 pages, Toyota, United Kingdom.

Ruhs, Chris, "My Favorite Android Apps: Maps," Jun. 24, 2011, 1 pages, available at http://www.youtube.com/watch?v=v2aRkLkLT3s.

Invitation to Pay Additional Fees and, Where Applicable, Protest Fee for PCT/US2013/043776, Nov. 21, 2013 (mailing date), Apple Inc.

International Search Report and Written Opinion, dated Dec. 22, 2014, received in International Patent Application No. PCT/US2013/043776, which correpsponds with U.S. Appl. No. 13/907,837, 29 pages.

* cited by examiner

INTERACTIVE MAP

CLAIM OF BENEFIT TO PRIOR APPLICATIONS

This application claims the benefit of U.S. Provisional Application 61/655,792, entitled "Interactive Map," filed Jun. 5, 2012, which is incorporated herein by reference.

BACKGROUND

The use of maps has become commonplace in many different facets of life. In addition to maps that are designed for general navigation purposes, information can be included on a map to meet specific objectives. For instance, a map to be used by tourists may identify the locations of hotels, restaurants and local attractions. A shopping map might typically include stores and other retail establishments in an area of interest. In contrast, a map intended for use by outdoor enthusiasts may include hiking and biking trails, campsites, parks and terrain information.

As can be appreciated, there is potentially an endless amount of information that can be included on a map of a geographic area. Because of the physical dimensions of the map, however, there is a practical limit on the amount of information that can be included in the available space. Consequently, a trade-off must be made between including a small amount of information for each of a variety of different types of users, or a greater amount of information that is specific to one or two types of users.

Electronic maps are available for a variety of computing devices, such as personal computers, tablet computers, personal digital assistants and mobile telephones. Different applications for use on these devices can provide maps that address different interests of a user. For example, a navigational application might typically display a map with a street and highway view of an area. A fast food chain might make available a map that displays the locations of its restaurants or coffee houses in a geographic area. A traffic map can provide a user with dynamic information relating to accidents, road blockages, and similar such situations that are of interest to a traveler.

While the amount of information that can be stored or accessed within an electronic computing device enables a user to obtain different maps, depending on the user's interest at any given time, it is necessary for the user to switch among different applications in order to view various types of information that may be of interest. For instance, while viewing a weather map, if the user realizes that a rainstorm is approaching, it may be necessary to switch to a different map application to locate a restaurant or shopping mall where the user can take refuge while the storm passes. It would be useful to have a map that contains all of the various types of information that is pertinent to different interests, while at the same time managing the display of that information so that the components of the map relevant to the user's interest at any given time are displayed in a meaningful manner.

SUMMARY

To accommodate the large amount of information that can be potentially displayed on an electronic device, some embodiments of the invention provide a map that has an interactive capability that enables a user to dynamically adjust the displayed content. In some embodiments, different viewing modes can be chosen to emphasize map features that are relevant to a particular interest, e.g. commuting, tourism, outdoor recreation, weather, shopping, and the like. Other map features that are not pertinent to that particular interest can be deemphasized, or hidden from view. A user preference item enables the user to select two or more modes for simultaneous viewing on the map, e.g. weather and outdoor recreation. Customized map views created in this manner can be saved, and shared with other users. If a user conducts a search while in a particular viewing mode, the search results can be filtered in accordance with attributes of that viewing mode. For example, a search for "food" conducted while the map is in a tourist view might present the results with priority given to restaurants in the vicinity of the user, while the same search conducted in the outdoor recreation view might prioritize according to stores that sell food for campers.

In another aspect, user input can be directed at specific features displayed on the map, such as clicking a mouse button while a cursor is positioned over a dot representing a city, or touching a highway indicator on a map displayed on a touch screen device. In response to such input, the map displays information that pertains to the feature of interest. For instance, clicking on a city dot might result in the display of information pertaining to the city, such as demographics, hotels, flight schedules, etc. Touching a highway indicator, such as a route number shield, may cause the map to display the locations of fueling stations, hotels and restaurants along the route. Touching two points on the map, such as two different city dots, can result in the calculation of the distance between the two points and/or calculation of one or more routes between the two locations, along with information that may assist the user in deciding which one of the available routes to select.

In accordance with another aspect, geospatial applications can be integrated with the map to selectively provide the user with information pertinent to the current vicinity of the user. For example, if the map is in a tourism viewing mode while the user is passing through an area of historical significance, the map can provide historical facts related to the area, either textually or audibly. While in the shopping mode, the map can display ads of stores that are in the vicinity of the user.

These and other features of an interactive map are described hereinafter in greater detail, with reference to exemplary embodiments illustrated in the accompanying drawings. The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide an application that displays images of a map to a user of a computing device. Although not limited thereto, exemplary embodiments of such an application might be implemented as applets, or "apps" that execute on portable computing devices, such as smartphones, tablet computers, personal digital assistants, navigational devices, and the like.

Figure 1:
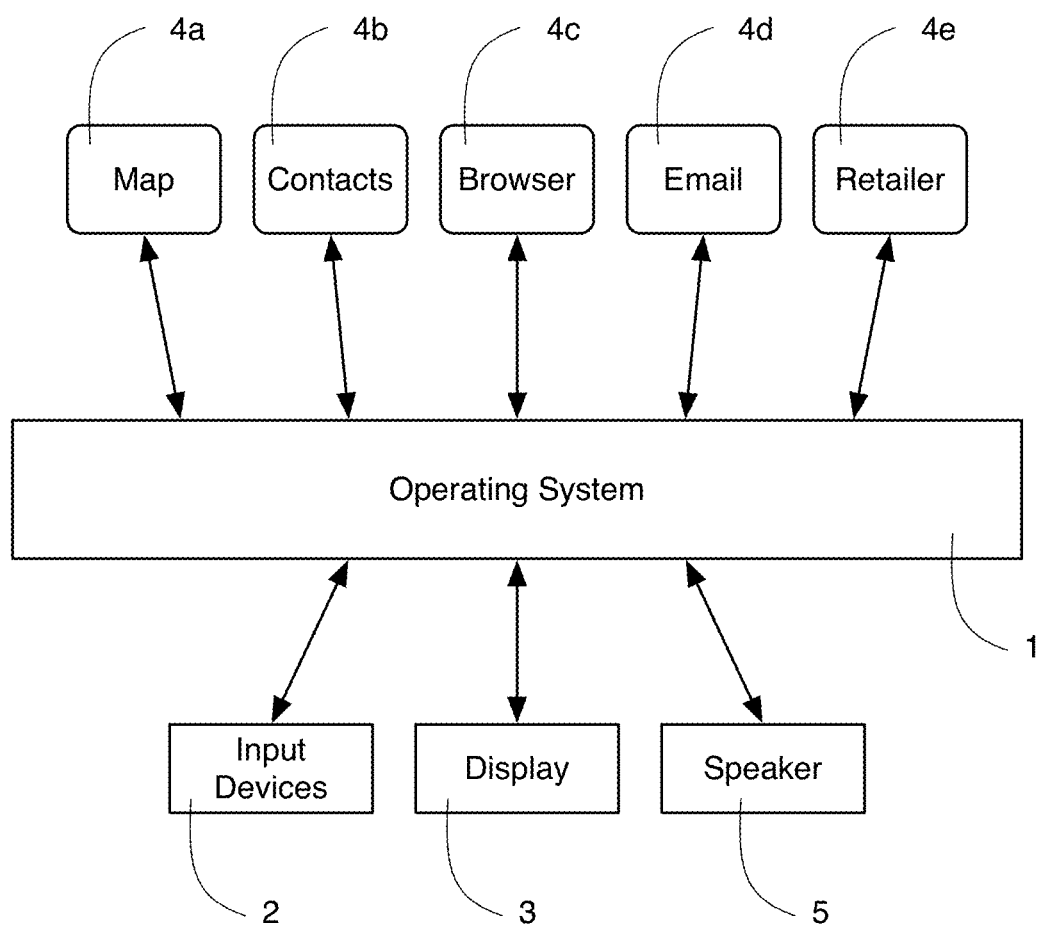
FIG. 1 is a general block diagram of the software architecture of a computing device.

An example of the basic software architecture for such an implementation is illustrated in FIG. 1. Referring thereto, the computing device includes an operating system 1 that handles the primitive functions associated with the functionality of the device. These functions include receiving input signals from one or more user input devices 2, such as a touchscreen, trackpad, mouse, keyboard, button, etc. Some of these input signals may invoke the operating system 1 to directly effect changes on a display device 3, e.g. enlarge an image that is being displayed. Other input signals may be interpreted and passed along to one or more applets 4a-4e that are resident in computer-readable memory of the device. Examples of such applets include a map application 4a, a personal contacts application 4b, a browser 4c, an email application 4d, and a custom application 4e associated with a retailer. It will be appreciated that, in addition to these examples, a multitude of other types of applets could be installed and executed on the computing device.

An input signal forwarded by the operating system 1 to an active applet may invoke certain functionality of that applet. In response, the applet may send a command to the operating system 1 to present certain information on the display 3. Alternatively, or in addition, the applet may command the operating system to generate an audio sound, that is presented to the user via a speaker 5.

Figure 2:
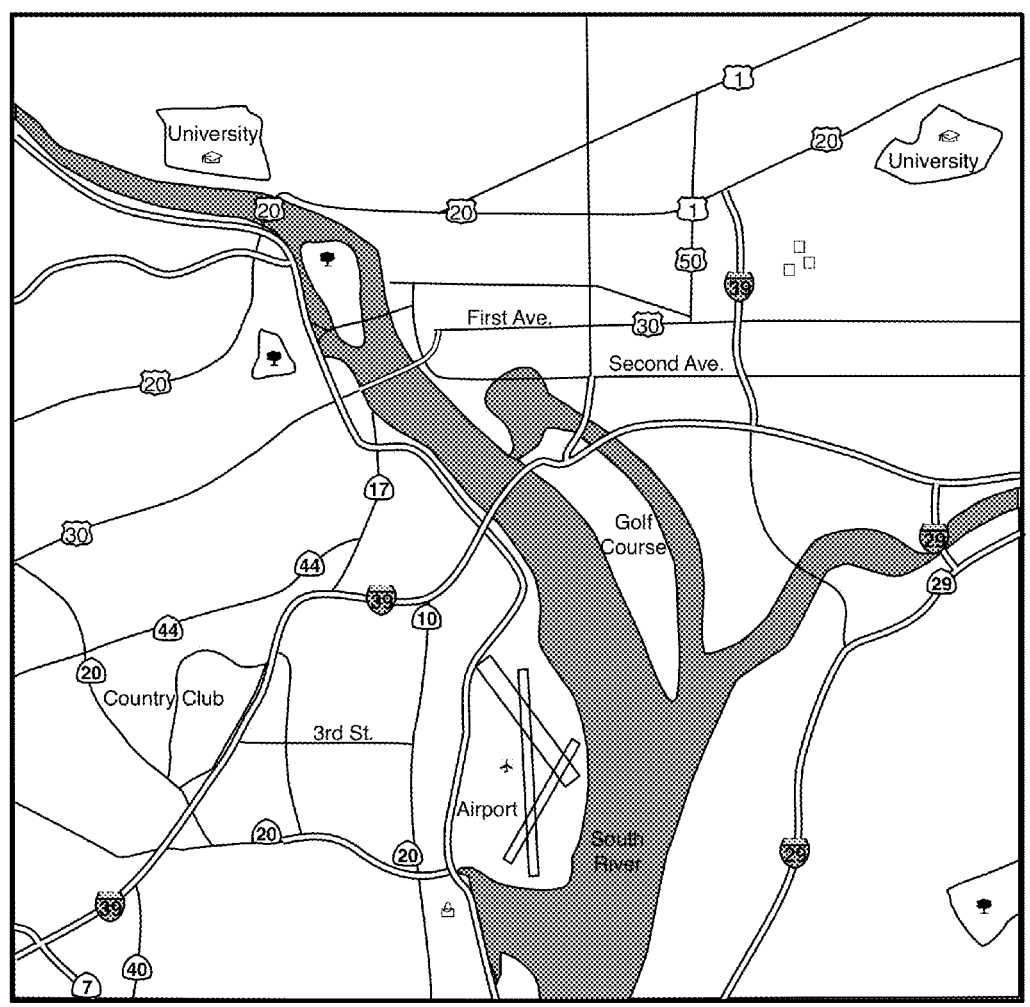
FIG. 2 is an illustration of a map that can appear on the display of an electronic device.

To facilitate an understanding of the concepts that are described hereinafter, a brief overview of the functionality of an interactive map is first presented with reference to exemplary embodiments of map images that are displayed in response to various types of user input. FIG. 2 illustrates an example of a map 10 of a metropolitan area that may be displayed on an electronic device, for example, by accessing an Internet website. Alternatively, the device can display the map 10 through a map application that executes on the device. In some embodiments, this application downloads map data (e.g., map tile data) that describes the area, and renders the map data to generate the map 10.

A map of the type shown in FIG. 2 in some embodiments is used for navigation purposes. Accordingly, the major features illustrated on the map are streets and highways, as well as significant geographical features, such as a river, and other large landmarks, such as an airport, golf courses, and universities. Typically, such a map might also include the names of the regions shown on the map, such as residential communities, industrial parks, and the like. For the sake of clarity, these types of names have been omitted from the illustrated map.

Figure 3:
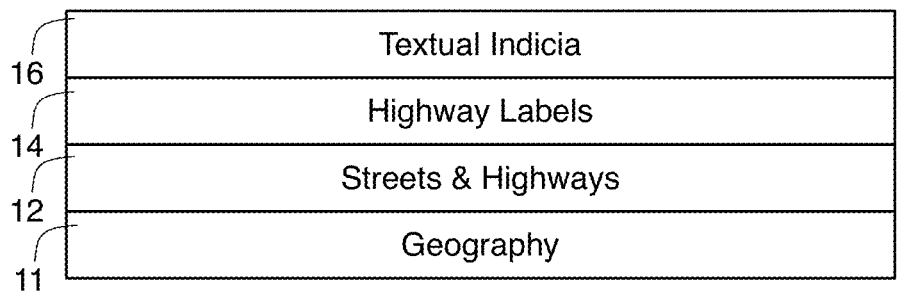
FIG. 3 is a schematic illustration of information layers that may be associated with the map of FIG. 2.

Although the map appears to the viewer as being a single flat surface containing all the displayed information, the view is actually a composite of several layers of different respective types of information. Referring to FIG. 3, for example, the map illustrated in FIG. 2 may include a base first layer 11 containing the geographic features of the map, such as the river, various parks and similar open areas, and the like. A second layer 12 may contain the streets and highways depicted on the map. In some embodiments, all of the streets and the highways may be contained in a single layer, whereas in other embodiments, the major streets and highways may be in one layer, and smaller side streets may be in a separate layer. The badges and other symbols that are used to identify the major highways could be in the same layer as the depiction of the highways themselves, or on a separate layer 14. The textual information describing other features on the map, such as the labels of the airport, golf courses and universities can be in yet another layer 16. When the map is displayed, the layers are superimposed on one another, to present the composite view depicted in FIG. 2.

Figure 4:
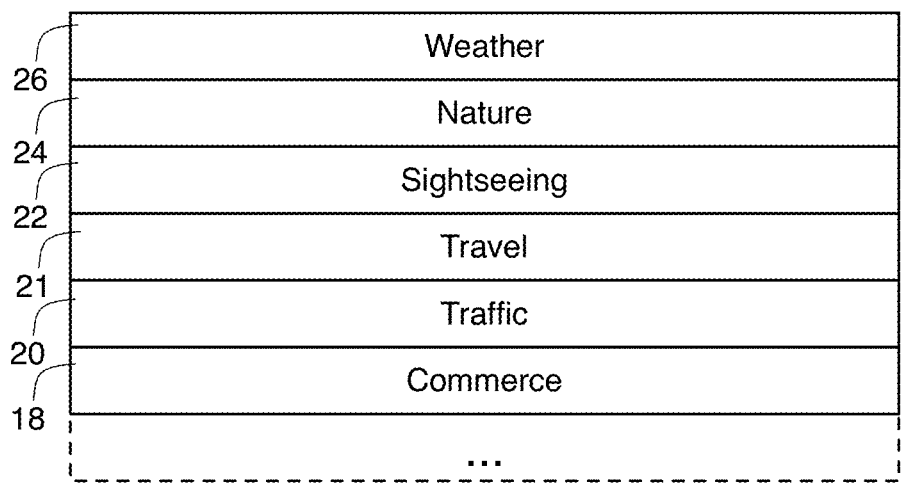
FIG. 4 is a schematic illustration of additional information layers that might be associated with the map of FIG. 2.

Through the use of layers in this manner, a large amount, and variety, of information can be presented in a map. FIG. 4 illustrates an example of additional layers that can be employed to provide information that is pertinent to different areas of interest. For example, a commerce layer 18 may contain a depiction of individual commercial establishments within a region, such as retail merchandise stores, restaurants, coffee shops, etc. Such a layer might also contain advertisements associated with certain establishments, and special deals that are being offered at the establishments depicted on the map. Similarly, critics' ratings of restaurants can be displayed in conjunction with the listing of the restaurants.

A traffic layer 20 may display driving-related information. As an example, the layer may constitute an overlay of the major streets and highways that is color coded to identify traffic flows. For instance, a section of the highway that is flowing at normal speed might be colored green, an area where the traffic is moving, but at a slower pace, might be colored yellow, and a section in which traffic comes to a stop can be colored red. In addition, the traffic layer may include symbols to identify particular events, such as the locations of the accidents, road blocks and construction zones that affect traffic flow.

A travel layer 21 may contain information that identifies hotels and other forms of lodging, airports, train stations, rental car facilities, and the like. The layer may also include posted rates and/or ratings for the hotels, and links to arrival and departure schedules at the train stations and airports. Other information that may be of interest to the traveler can be also be displayed. For instance, real time information regarding the availability of rooms at individual hotels can be downloaded and displayed adjacent the name of the hotel.

A sightseeing layer 22 may contain information that identifies museums, art galleries, natural wonders and other such places of interest.

A nature layer 24 can include information relating to various natural phenomena. For instance, the terrain, or topology, of a region can be displayed. Other items of interest might include campsites, popular fishing spots and the locations of rapids in a river.

A weather layer 26 can display a radar view of the region, to illustrate areas receiving precipitation, as well as the type and intensity of precipitation. Other information included in the weather layer could include temperature gradients and wind conditions.

If all of the information contained in each of the layers is displayed to the user in a composite view, the resulting map would be cluttered and may not be comprehensible to the user. At any given time, however, the user is unlikely to be interested in all of the various types of information. For example, while commuting to and from work, the user is unlikely to be interested in the type of information contained in layers directed to commerce, travel or nature. In accordance with disclosed embodiments, the cartography of appropriate layers is adjusted so that individual features are selectively emphasized or de-emphasized in the display of the map. As a result, only the information that is pertinent to the user's current state of interest is displayed. This functionality is achieved by associating different modes of operation with different layers of the map, and perhaps different sets of information within those layers.

Figure 5:
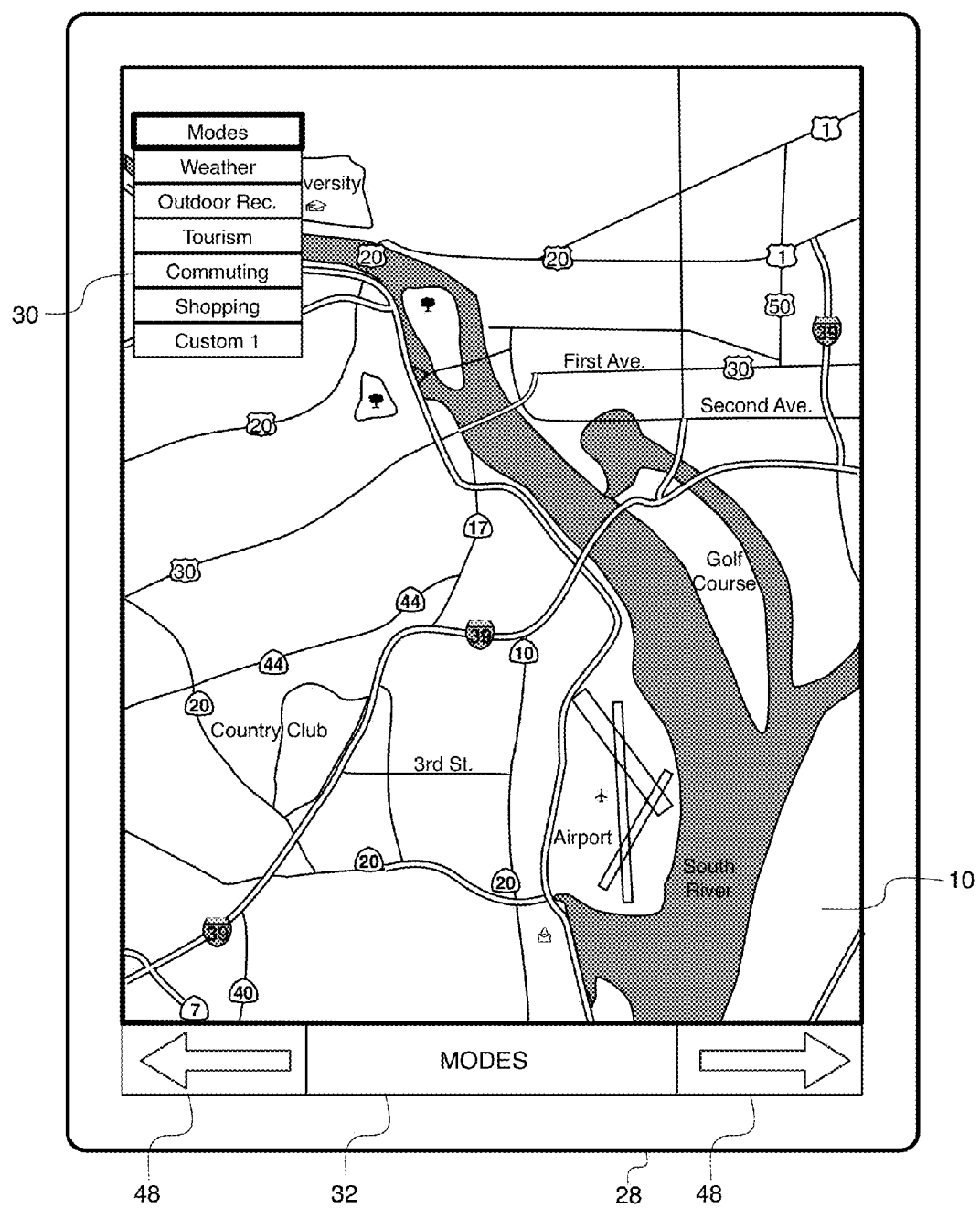
FIG. 5 is an illustration of a display screen on an electronic device in which a mode menu is displayed for the map.
Figure 6:
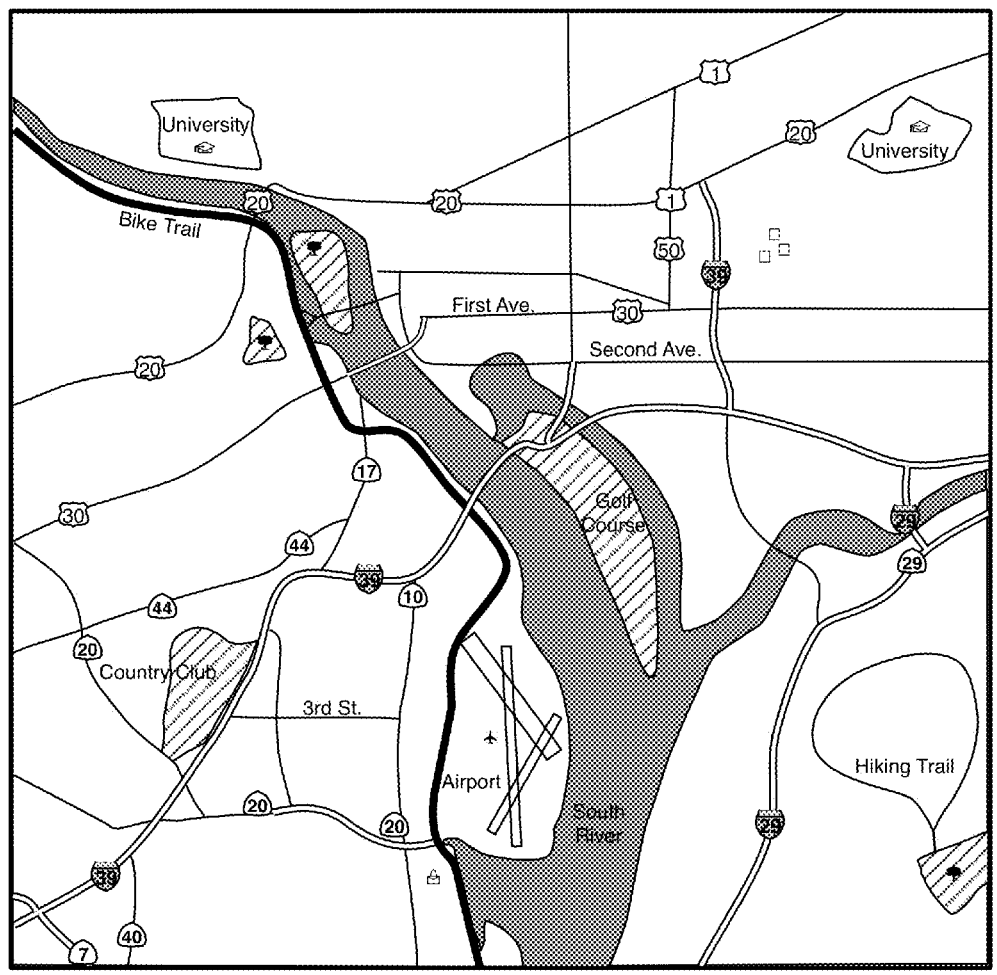
FIG. 6 is an illustration of the map in the outdoor recreation mode.

FIG. 5 illustrates the display screen 28 of an electronic device on which the map 10 is displayed. A mode menu 30 can be displayed in response to a predetermined user input, e.g. activating a button 32 or similar control element displayed adjacent the map 10. From this menu, the user can select a desired viewing mode. Upon selecting the outdoor recreation mode, for example, the device can show golf courses, parks, hiking and biking trails, and other information contained in relevant layers on the map with greater prominence, as shown in FIG. 6. As shown in this figure, other content of the layers that does not relate to outdoor recreation mode is de-emphasized.

This result is accomplished by associating one or more layers of information with each viewing mode. The layers associated with a given mode are those that contain information relevant to that mode. In the case of the outdoor recreation mode, for instance, the base layer 11 may contain information relating to the golf courses, parks and bodies of water. Some of the information contained in the nature layer 24, such as terrain or topology, may be relevant to activities such as climbing and off-trail adventures, and therefore this layer may also be associated with the outdoor recreation mode. Another layer may contain information pertaining to biking and hiking trails, and could also be associated with the outdoor recreation mode.

For each layer associated with a particular mode, displayed features that pertain to that mode are emphasized, whereas other features in that layer that are not pertinent to the mode are deemphasized. For instance, the golf courses and parks in the base layer 11 might normally be displayed with a medium green color, but when the outdoor recreation mode is selected, those same areas can be displayed with higher saturation values, and/or a more vivid hue, to thereby provide greater emphasis. Similarly, bodies of water that are normally presented in a light blue color can be emphasized by displaying them with a more intense shade of blue. At the same time, other features in the base layer 11 that are not relevant to the outdoor recreation mode, such as highways and the airport, can be displayed with low saturation values, and/or using only gray scale colors. In another approach, the relative emphasis of different features can be achieved through adjustment of the transparency, or alpha value, of the display data for the respective features.

The same approach is employed for each of the other layers associated with the chosen viewing mode. Layers that are not associated with the mode, i.e. those which do not contain information relevant to the mode, can be entirely turned off, by blocking the data from those layers, so that their information does not appear on the map.

Another viewing mode may have a different set of information layers and/or emphasized features. For instance, in a commuting mode the highway information from the base layer 11 would be emphasized, whereas geographic features would be de-emphasized. Information from the traffic layer 20 is also associated with this mode. In addition, if the commerce layer 18 contains information pertaining to fuel stations, that layer would be associated with the viewing mode, and those stations would be emphasized in the display, perhaps along with other shops (e.g., coffee shops) nearby. At the same time, other types of commercial establishments, such as clothing stores, are deemphasized.

Thus, through the association of different information layers with different viewing modes, and selective emphasis and de-emphasis of the information in each of those associated layers, a large variety of different sets of information are made available to the user, to accommodate the particular interest of the user at any given time. By associating the layers and features with different modes of operation, only that information that is pertinent to the user's current state of interest is presented, to thereby maintain a cleaner, more intelligible appearance to the map. As mentioned above, the generation of the appropriate map displays through the selection of the appropriate layers for particular viewing modes (e.g., the selection of layers associated with the particular viewing modes), the filtering out of the data from the selected layers, and/or the emphasizing and deemphasizing of the data in the selected layers, can be performed by different actors in different embodiments. For instance, this generation of the map display is performed by an application (e.g., operating system, mapping application, etc.) executing on the device that displays the map in some embodiments. In other embodiments, the device communicatively couples (e.g., through the Internet or other network connection) to a server, computer, or other device that generates the appropriate map display through the above-described selection, filtering and emphasizing/de-emphasizing approach. The displaying device then receives the generated map view for display from the server, computer or other device.

The ability to alter the relative visual emphasis of layers and features in the map makes the map a more efficient user interface for the user. For example, when a layer is visually deemphasized, that layer ceases to hinder the user's exploitation of the layer or layers in which he is primarily interested. However, when the layer is only deemphasized, and not omitted, the user can still refer to information in, or interact with, that layer if desired.

Figure 7:
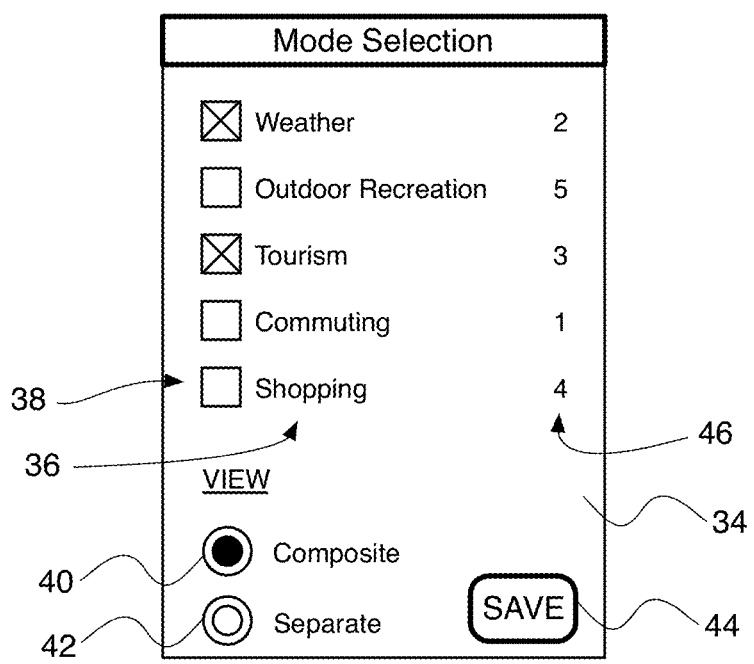
FIG. 7 is an illustration of a dialog box for entering user preferences pertaining to the viewing modes of the map.
Figure 8:
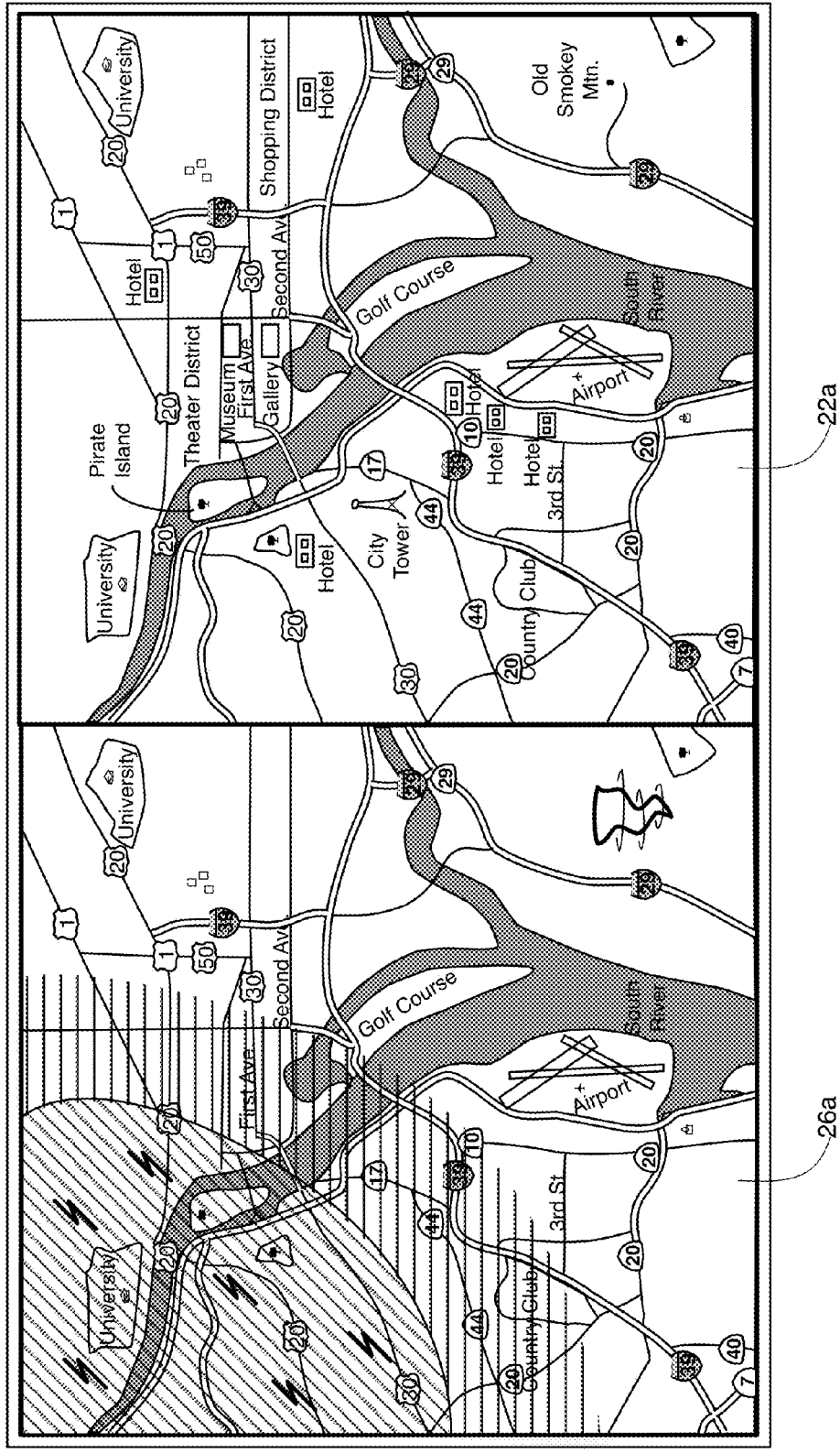
FIG. 8 is a display of two map modes in a side-by-side viewing option.

In a further embodiment, the user can be provided with options for customizing the display of the map in various modes. FIG. 7 illustrates one example of a user preference dialog box 34 that can be employed for such a purpose. The dialog box includes a list 36 of each of the available viewing modes of the map. Adjacent each listed viewing mode is a checkbox 38 that enables the particular modes to be displayed in a customized view. In the example depicted in FIG. 7, the user has selected the tourism and weather modes for concurrent display. The dialog box also contains radio buttons 40 and 42 that enable the user to indicate whether the selected modes are to be displayed in a composite view, or separately. In the illustrated example, the user has selected the composite view option 40. Therefore, when this customized view is displayed, the information in the weather layer will be superimposed on the features displayed in connection with the tourism made. Alternatively, if the user had selected the separate view option 42, two maps would be displayed in a side-by-side manner, as shown in FIG. 8. In this view, weather information is displayed in one map 26a, and the other map 22a displays the tourism features. With the "separate" option, the user may be able to select up to four different modes, and have a map corresponding to each mode displayed in a respective quadrant of the viewing screen. Alternatively, in some embodiments, each viewing mode would be displayed individually on the viewing screen when the multiple views have been selected for separate display, and the user could swipe through the different viewing modes through a touch gesture, cursor control operation, or through other UI operations.

The user preference dialog box 34 includes a button 44 that allows the user to save the selections in a customized view, which can then be chosen via the mode selection menu depicted in FIG. 5. The saved information includes the particular views that have been chosen, as well as the option that has been selected for displaying those views. Once a user has saved a customized view of the map, a data file containing the saved information can be shared with other users, so that they can add it to their mode menus and be able to select that view when the mode selection menu is accessed.

The user preference dialog box 34 also enables the user to establish an order of priority for the various views. In the example of FIG. 7, the dialog box includes a column 46 in which the user can enter an ordinal number to prioritize the modes. Alternatively, the user might simply re-order the listed modes by dragging them within the dialog box to relative positions in accordance with a desired ranking. By means of this feature, the user can easily switch between different viewing modes without having to explicitly select them via the menu. For instance, when the map application is first launched, it may automatically default to the viewing mode having the highest priority, e.g. the commuting mode in the example of FIG. 7. By selecting a directional arrow 48 displayed adjacent to the map (shown in FIG. 5), the user can switch the view to the next-highest priority mode, e.g. the weather mode. If the map is being viewed on a touch screen type of device, switching to the next mode might be accomplished by a swiping movement similar to that used to turn the page of a book. In essence, therefore, by prioritizing the viewing modes, the individual modes are arranged in a viewing sequence that facilitates the user's ability to switch back and forth between different modes of interest.

The use of layers of information with features that can be selectively emphasized and deemphasized, or enabled and disabled, provides the ability to display a potentially limitless amount of information within a single map. Moreover, the extensibility of the map, through the addition of further layers of information, is not limited to the original developer of the map application. Rather, third parties having collections of information that are suitable for display on the map can contribute additional layers. For instance, many different retailers provide applications and/or websites that enable a user to locate the stores, shops and/or restaurants of those retailers. That information can be incorporated into an additional layer that may be displayed on the map. Thus, rather than requiring the user to go to a separate application, or browse to a different website, information regarding a retailer of interest can be readily displayed by selecting an appropriate mode of the map with which that layer is associated.

In addition to retailers, other service providers can utilize layers of information to assist viewers. For example, a real estate layer can display the locations of houses that are being offered for sale by a real estate agency. A dialog box associated with such a layer might enable the user to filter the display according to various categories, such as price range, number of bedrooms, etc.

In some embodiments, the user might operate via browsing, in which specific locations are entered into a user input area to bring up a desired region of the map. Once the map is showing a region of interest, the user might manually move the map to browse to different areas within the vicinity of the displayed region.

In some embodiments, the map can be integrated with one or more geospacial applications, which cause the image on the map to scroll in accordance with movement of the electronic device on which the map is being displayed. For instance, if the user is walking or riding in a vehicle, the map can scroll in accordance with the pace and direction of movement in which the user is traveling, so that the map remains centered on the user's current position. The geospacial applications can respond to the movement by displaying new information that is relevant to the user's current location.

Some embodiments provide many other features that relate to the integration of geospatial information with the map to selectively provide the user with information pertinent to the current vicinity of the user. For example, if the map is in a tourism viewing mode while the user is passing through an area of historical significance, the map can provide historical facts related to the area, either textually or audibly. While in the shopping mode, the map can display ads of stores that are in the vicinity of the user.

In some embodiments, the user might enter a request to find the least expensive hotel within 30 minutes travel time of the user's current location. By recognizing the direction of movement of the user, the application can filter search results to display only the identified hotels located in a downstream direction of the user's movement, and ignore those located behind the user. Moreover, the application can take into account commuting patterns at the particular time of day in which the request was entered. For example, if the user is moving into a major metropolitan area during the evening rush hour, the application can filter out hotels that are located on major commuting routes that are likely to be congested, and/or contract the search radius due to slower travel speeds.

Another example of the interactive nature of the mapping application of some embodiments relates to search. When a user conducts a search while in a particular viewing mode, the search results can be filtered in accordance with attributes of that viewing mode. For example, a search for "food" conducted while the map is in a tourist view might present the results with priority given to restaurants in the vicinity of the user, while the same search conducted in the outdoor recreation view might prioritize according to stores that sell food for campers.

Figure 9:
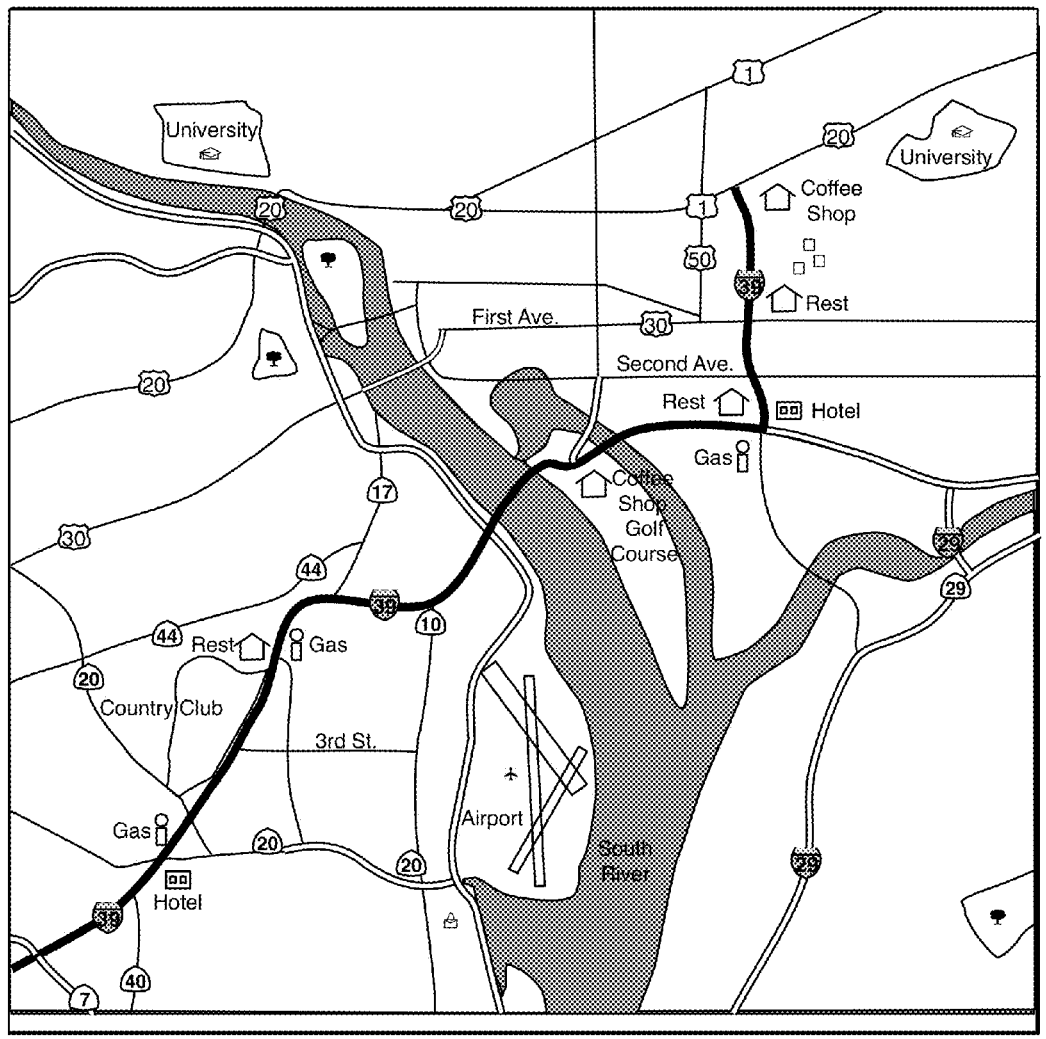
FIG. 9 is a view of a map in which a feature has been highlighted in response to a user input.

In another aspect of its behavior, the map application can react to user input that is directly entered onto the map, e.g. by tapping on the map in a touch screen environment, or clicking on the map with a cursor controller or similar such user input device. This ability to interact with the map can be available while the map is in a standard viewing mode, or any one of the user-selectable viewing modes described above. One example of this behavior exhibited is illustrated in FIG. 9. Referring thereto, in this particular example, a user input has been directed to the highway shield symbol for Interstate Route 39, e.g. by pressing or clicking on the shield. Alternatively, the user might click on the depiction of the highway itself. In response thereto, the path of the route itself becomes emphasized on the map. As in the previous examples, this can be accomplished by increasing the saturation value of the color used to depict the highway in the layer 12, displaying the color in a brighter hue, or switching to a more pronounced or vivid color. For instance, if a highway is normally displayed in a gray or white color, that color can be changed to a bright red to highlight the highway when the user taps on the highway shield. At the same time, all of the other features in that layer, as well as any other layer that is being displayed, can be presented with more subdued colors, or in grayscale.

In addition, other information relating to that route can be displayed. Examples of such information might be services that are available at the next exit, such as fuel, lodging and food. Prices associated with any of these services might also be displayed, either directly in response to the user's initial input, or as a result of a further selection made by the user. For instance, if the user taps or clicks on an indicator associated with fuel services, the prices for the five closest fuel stations might be displayed. The distance to each of the available services could also be provided in the initial display, or as a result of a further selection by the user. Likewise, availability of a service, such as the number of vacant rooms at a hotel, could be displayed. This information might be contained in one or more layers that were not previously being displayed, but are activated when the user taps or clicks upon the highway symbol.

To provide international applicability, the textual labels that are displayed for the services and other information can be stored in a number of different languages. For each label, a database can store a plurality of terms that are respectively associated with a different language. By selecting a particular language, for instance in a settings menu (not shown), the corresponding terms for that language are retrieved from the database when labels are to be displayed on the map.

The highlighted feature can be used to guide scrolling of the map in response to user input. For instance, in a touch input device, if the user swipes the screen in a vertical direction, the image of the map moves in that direction. In the example of FIG. 9, an upward swipe would cause the map to move vertically up. In that case, the resulting image of the map that is displayed may no longer contain the portion containing Route 39, since that highway is oriented at an angle. Consequently, the user would also have to perform a horizontal swipe, in this case to the right, to maintain the view centered on the highway. In some embodiments, however, when a feature is highlighted, the scrolling of the map in response to user input causes the highlighted feature to remain within view. Thus, in the example of FIG. 9, if the user performs a vertical swipe, the map moves up, but also moves automatically to the right without the need for an additional swipe, to keep the highway within the viewed portion of the map. As a result of this behavior, navigation of the map is made easier for the user.

As another example of this interactive behavior, if a user taps or clicks upon a readily visible feature on the map, not only is that feature emphasized, but other features of the same type are also highlighted. For instance, a large park might be apparent on the map, but due to scale, smaller parks may be difficult to discern without enlarging the map. If the user taps or clicks on the visible large park, all of the parks on the map can be emphasized, e.g. displayed in a bright green color. As a result, if the user sees a bright green dot representing a small park in an area of interest, he or she can expand the map in that particular area to see the park and its surroundings, without having to perform a laborious search for the park.

In a similar manner, if a user taps or clicks upon a five-star rated hotel, all of the other five-star hotels can be highlighted, and/or displayed if they were not previously visible on the map. The choice of additional feature information to highlight in response to user input can be based upon heuristics that identify the most likely reason a user selects a particular feature, e.g. in dependence upon the current viewing mode. For instance, if the user makes a selection near a highway and a small road during a cross country trip, the mapping application would select and display more prominently the highway as it is more likely to be relevant to the cross country trip.

As another component of this behavior, touching or clicking upon two points on the map can cause the distance between those to points to be automatically calculated or a route between those two points to be automatically calculated and displayed. In some embodiments, this feature might be activated by touching on the two points simultaneously, with two fingers, and holding the touch for a certain period of time, e.g. three seconds without moving the fingers. In an alternative implementation, the interactive behavior might be activated by sequentially touching or clicking upon the two points within a certain time of one another, e.g. two clicks within two seconds of one another. In this latter implementation, third and subsequent clicks or taps within the set period of time between each can cause a route to be established that follows the order of the taps or clicks.

When a route is displayed in this manner, metric information, such as the distance of the route, and/or the time to reach the destination, can also be calculated, and displayed. If the user identifies another user, for example by means of a contacts database, the estimated time of arrival at the destination can be sent to the computing device of the other user as a text message. Alternatively, the location of the original user can be displayed to the other user on a local copy of the map at the other user's device.

The ability to provide such information is implemented by associating intelligence with the various features of a map. Conventionally, a user might be able to expand or contract the area displayed on a map, but is not otherwise enabled to interact with the map. In some embodiments, individual features on the map function as input mechanisms, e.g. links or soft buttons, to activate the display of information associated with those points. Thus, touching or clicking upon a highway shield causes information to be displayed that is pertinent to travelling along that highway. Conversely, tapping on a city dot may cause the map display to zoom in on the city and the display of information pertinent to the city, such as hotels, airline flights, major points of interest, etc. For larger regions, such as a county, state or prefecture, clicking on the name of such a region in the map may cause the display of information relating to that region. If the user presses on such an item and then holds the press, additional information can continue to be presented for the duration of the hold. For instance, more and more information about an area can be displayed. Alternatively, the hold may cause the region for which information is displayed to grow in size. As an example, the initial press may cause information about a city block to appear, and continued pressing can cause additional information pertaining to a growing range of adjacent blocks to appear.

One action that is commonly used on digital maps is to drop a pin to identify a location of interest. In a typical operation, once a user has located a point of interest on a map, e.g. by searching for a particular address, the user can drop a pin at that location, and then enter a name for the location. The location and name are stored in a list, to enable the user to easily return to that location on the map by selecting the name from the list.

In some embodiments, when a user initiates an action to drop a pin at a location on the map, a text loupe appears at that location. The text loupe provides detailed information about the point on the map that is below the loupe, e.g. street address, name of a building, etc. By moving the loupe, the user obtains immediate feedback to obtain a precise and accurate location. Once the specific point of interest has been located, the user can complete the action to drop the pin at precisely the desired location.

While the examples of maps illustrated in the figures depict two-dimensional views, it is also known to present three-dimensional views in maps. When a pin is used, one limitation of three-dimensional views is that the pin can become obscured by objects in the view as the map is rotated. For instance, a pin that is placed at the front of a building, e.g. at the street entrance, will become hidden as the user moves the view to the other side of the building. To avoid this occurrence, in accordance with one aspect of the invention, the pin is not anchored on the ground, but is depicted as hovering over the point of interest. For instance, a balloon metaphor can be employed to create the appearance that the pin is tethered to the top of the building. Thus, as the three-dimensional view is rotated, the pin remains in sight.

In some embodiments, navigation of the map is facilitated with the use of a magnifying glass that has associated metadata to provide an enhanced view of a region on a map. The center of the magnifying glass presents an enlarged view of the map with sufficient detail to enable the user to precisely select a location. On the other hand, the outer periphery of the magnifying glass provides a lower resolution view and shows regions that are more geographically spaced from the center, e.g. a neighboring city. For instance, the image through the magnifying glass could be similar to that of a fish eye lens, such that the center portion of the image is sharp and focused on a small area to provide detail about that area, whereas the outer portions of the image show surrounding regions, to provide context. As an example, the center of the image may provide detail about one block in a major city, while the portions of the image outside of the area of focus may provide the names and locations of other major cities that could be hundreds of miles away.

In some embodiments, some of the information that is displayed on the map may be stored locally on the user's device. For example, relatively static information contained in each of the exemplary layers depicted in FIGS. 3 and 4 might be stored locally in conjunction with a map application, and updated on a periodic basis as new information becomes available. Other information can be stored remotely from the user's device, and accessed on a real-time basis as the user interacts with the map. Various types of information can be stored in different respective databases, and accessed as appropriate.

Figure 10:
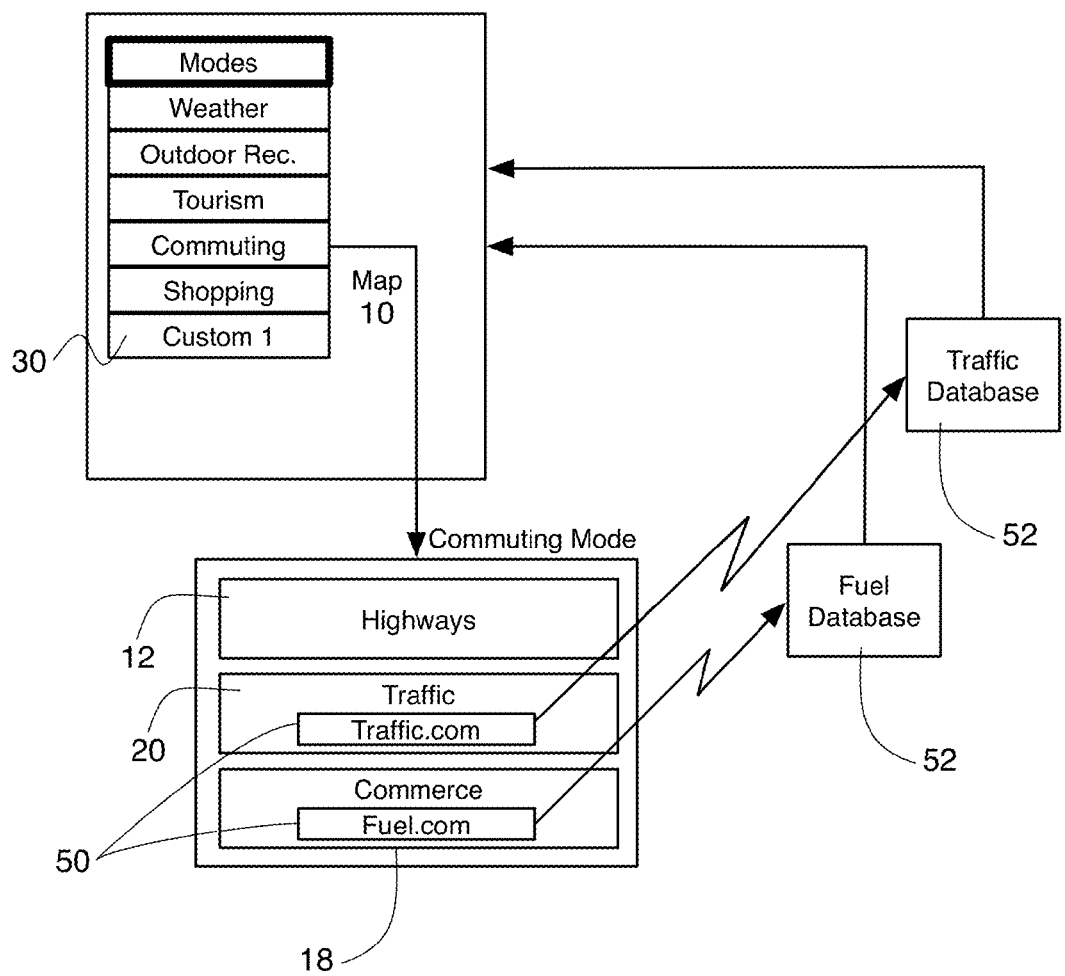
FIG. 10 is a schematic representation of the accessing of data from remote databases for a display mode.

For example, when the commuting mode of the map is being viewed, the map application can access one database that provides current fuel prices, and another database that provides real-time traffic information. To this end, the information stored in the layers associated with the commuting view might include hyperactive links 50 to the various databases 52, as shown in FIG. 10. When the commuting mode is selected via the menu 30, these links are activated to access the databases. Another example would be displaying points of interest based on data in pre-built databases or from a database compiled from previous user searches. The data from the various databases is merged into the display that is shown for the currently displayed mode(s).

As a further feature, the user is provided with the ability to interact with the map on a temporal basis. For instance, various databases of information can store historical information covering an extended period of time. One example of such is a real estate database that may contain the sale prices for houses in an area, for a period up to thirty years. When the user accesses the real estate mode of the map, it might initially display the current listing price, or most recent sales price, for houses in the area displayed on the map. By moving a slider, or similar such control element, the user can cause the display to show prices from an earlier point in time, e.g. 5, 10, 20 or 30 years ago. Such functionality can be achieved by associating different positions on the slider with different segments of information from a database that stores historical housing sales data. In effect, each increment of movement of the slider causes the map application to transmit a new search query for data related to that increment.

Figure 11:
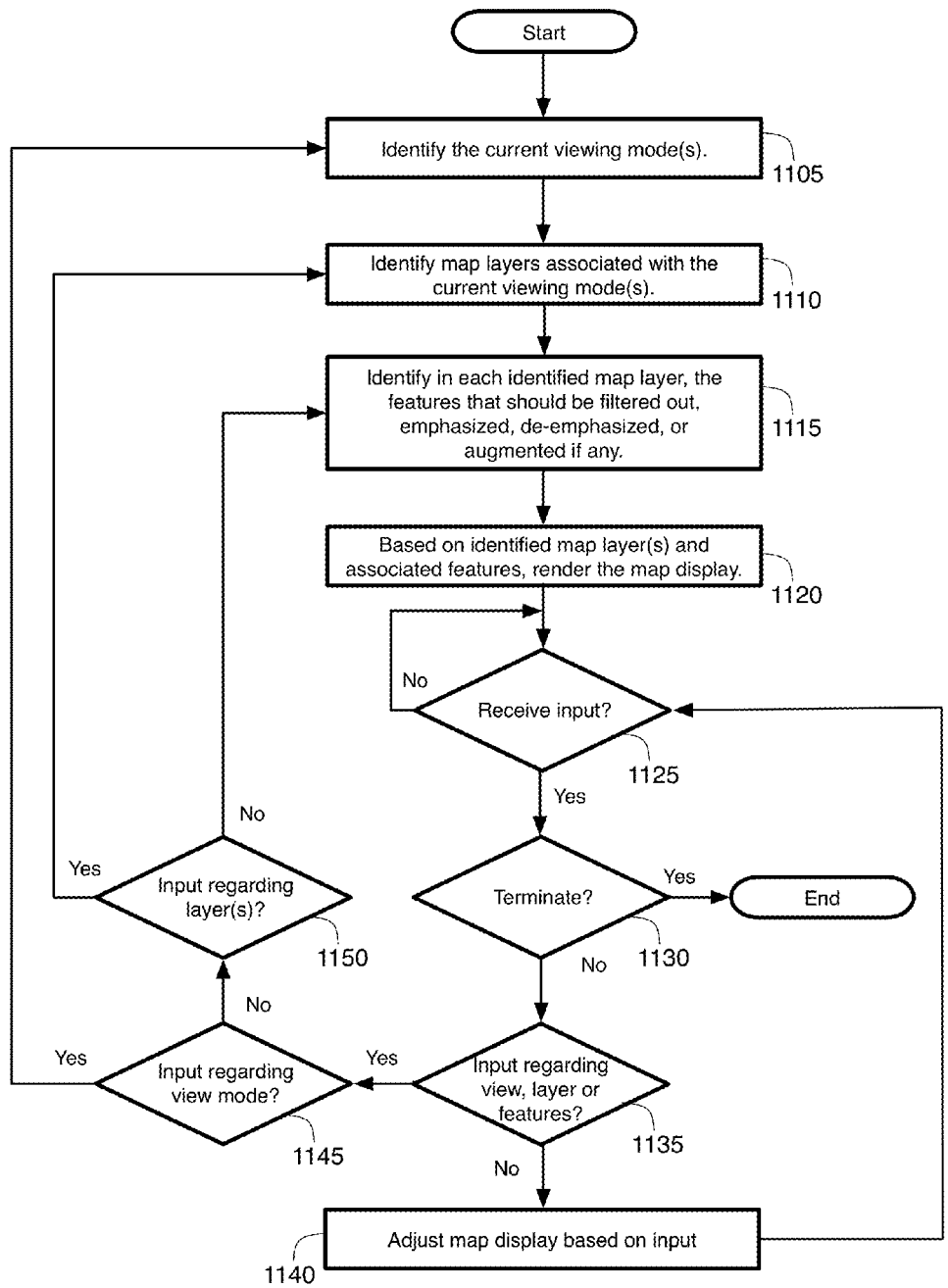
FIG. 11 conceptually illustrates a process of some embodiments of the invention for rendering a map display.

FIG. 11 conceptually illustrates a process 1100 that some embodiments perform to generate and modify a map display. This process generates the map display by selecting one or more layers for one viewing mode that is currently being displayed, or more than one viewing modes that are being concurrently displayed. For each layer, the process filters out the data from the selected layers, and/or emphasizes, deemphasizes, and/or augments the data in the selected layers, based on what needs to be displayed in the current viewing mode(s). Different actors in different embodiments perform this process. For instance, in some embodiments, an application (e.g., operating system, mapping application, etc.) executing on the device that displays the map performs this process. In other embodiments, a server, computer, or other device performs this process to generate a map display that it then supplies to the device that displays it.

As shown in FIG. 11, the process 1100 initially identifies (at 1105) the current viewing mode or modes for display. The current viewing mode or modes (1) can be derived from settings that are automatically determined by the process based on the operational modality of the map, and/or (2) can be specified in whole or in part from user selected settings, such as those described above by reference to FIG. 7.

As described above, the map display can be based on multiple viewing modes in some embodiments. Also, as described above, each viewing mode can be associated with one or more map layers that contain information relevant to that mode. For instance, in the case of the outdoor recreation mode, the base layer may contain information relating to the golf courses, parks and bodies of water, the nature layer may contains information about terrain or topology that may be relevant to activities such as climbing and off-trail adventures, and the trail layer may contain information pertaining to biking and hiking trails.

Accordingly, after identifying the current viewing mode(s), the process identifies (at 1110) all the map layers associated with all the current viewing modes. In identifying all the map layers, the process implicitly excludes all the map layers that are not associated with the current viewing mode(s), i.e. exclude those layers that do not contain information relevant to the current viewing mode(s). By excluding these layers, the process ensures that data from these layers do not appear on the map and thereby do not unnecessarily clutter the map display.

Next, at 1115, the process identifies in each map layer identified at 1110 the data that needs to be filtered out, emphasized, deemphasized or augmented. Specifically, for each layer associated with a particular mode, the process emphasizes in some map displays the features that are highly relevant to that mode while deemphasizing other features in that layer that are not as highly relevant to the mode. For instance, the golf courses and parks in the base layer might normally be displayed with a medium green color, but when the outdoor recreation mode is selected, those same areas can be displayed with higher saturation values, and/or a more vivid hue, to thereby provide greater emphasis. Similarly, bodies of water that are normally presented in a light blue color can be emphasized by displaying them with a more intense shade of blue. At the same time, the process displays other features in the base layer that are not relevant to the outdoor recreation mode (e.g., highways and airport) with low saturation values and/or gray scale colors.

In a commuting mode, the process of some embodiments emphasizes the highway information from the base layer, whereas it would de-emphasize or filter out geographic features. Information from the traffic layer may also be associated with this mode. In addition, if the commerce layer contains information pertaining to fuel stations, that layer would be associated with the viewing mode, and those stations would be emphasized in the display, perhaps along with other shops (e.g., coffee shops), while other types of commercial establishments, such as clothing stores, are deemphasized or filtered out.

To emphasize one set of features that are relevant to a viewing mode of the map, while deemphasizing another set of features that are not as relevant to the viewing mode, the process 1100 enhances (e.g., increases) the value of display parameters associated with the emphasized features relative to the default values for these features, while suppressing (e.g., reducing) the value of the display parameters associated with the deemphasized set of features relative to their default values. As mentioned above, examples of such displayed parameters that can be enhanced or suppressed include saturation, hue or other color values, and/or gray scale values. Instead of or in conjunction with such enhancements and suppressions, the process 1100 of some embodiments achieves the relative emphasis or de-emphasis of different features through adjustment of the transparency, opacity, or alpha value of the display data of the respective features relative to the default transparency, opacity, or alpha values of these features.

To augment data related to one set of features that are relevant to a viewing mode, the process 1100 of some embodiments retrieves from external sources (i.e., sources external to the device on which it executes) information about the features that it presents in a map display. Such external information can include up-to-date pricing information, availability information, traffic information, etc.

By associating different information layers with different viewing modes, and selectively emphasizing, deemphasizing and augmenting information in each of those associated layers, a large variety of different sets of information are made available to the user, to accommodate the particular interest of the user at any given time. By associating the layers and features with different modes of operation, only that information which is pertinent to the user's current state of interest is presented, to thereby maintain a cleaner, more intelligible appearance to the map.

After 1115, the process generates (i.e., renders) the map display (at 1120) based on the layer(s) identified at 1110, the features identified at 1115, along with their respective degree of emphasis, de-emphasis and/or augmentation, if any. The generated map display is displayed on a display screen of the electronic device. The rendering of the map display based on different layers of information is further described below by reference to FIG. 13.

Next, the process transitions to 1125, where it remains until an input is received. When the process receives (at 1125) an input, it determines (at 1130) whether the input requires termination of the map display. If so, the process ends. Otherwise, the process determines (at 1135) whether the input relates to a change of a current viewing mode, a layer of a current viewing mode, or a feature of a layer of a current viewing mode. If not, the input simply relates to an adjustment of the map display, and the process transitions to 1140 to make this adjustment and then transition back to 1125.

When the process determines (at 1135) that the input requires change to a viewing mode, a layer or a feature, it transitions to 1145. At 1145, the process determines whether the input relates to a change of a current viewing mode. If so, the process transitions back to 1105 to re-identify the current viewing mode(s).

Otherwise, the process determines (at 1150) whether the input relates to the addition or subtraction of a layer associated with a current viewing mode. If so, the process transitions back to 1110 to re-identify the map layers associated with the current viewing mode(s), and then perform the subsequent operations 1115 onwards to ascertain features to emphasize, deemphasize, augment and render. Many examples exist for identifying a new map layer for inclusion in the map display or for excluding a map layer from the map display. For instance, after selecting parks and being presented with hiking and biking trails from a trail layer, the user might select the ocean and in response be presented with information about beaches that is stored in a beaches layer. In some embodiments, the selection of the ocean as a feature in the map also directs the process to eliminate the trail layer from the map display.

When the process determines (at 1150) that the input does not relate to the addition or subtraction of a layer, the input relates to a feature within one of the layers of a current view. Accordingly, the process returns from 1150 to 1115 so that it can re-identify the features in the identified layer(s) that it should filter out, emphasize, deemphasize, or augment, if any. For instance, when the input is the selection of a particular item (e.g., a freeway, a freeway symbol, a shop, etc.) in the map display that is from a particular layer, the process in some embodiments has to change how it emphasizes, deemphasizes or augments the items that it shows for that particular layer in the map display. One example of this behavior exhibited was described above by reference to FIG. 9. Specifically, as mentioned above, a user selection of the highway shield symbol or the depiction of the highway itself causes the process to emphasize the path of the route itself while deemphasizing other features in that layer.

As mentioned above, the process accomplishes this emphasizing and/or deemphasizing by enhancing or reducing the values of the displayed parameters of the map features that are being emphasized and deemphasized. Alternatively or conjunctively, the process accomplishes the emphasizing and/or deemphasizing by adjusting the transparency, opacity and/or alpha values of the displayed parameters.

When a feature is selected on the map, the process in some embodiments augments the map display to show information about services related to this feature or to show additional information from external sources for this feature. For instance, in some embodiments, the information about fuel station in a map layer for a commute mode includes coffee shops and diners as related services to fuel stations as people often stop to eat when they are stopping to fuel their vehicles. This information would allow the process to emphasize coffee shops and dinners when the user selects a fuel station.

In another example, when a city is selected, the process displays the tourist attractions within or near the city, and travel-related services (e.g., transportation and lodging services) associated with the city as it correlates these other services with the city. Yet another example would be information in a layer that would associate highways with fuel, lodging and food services so that the process can show such services around a locality on the highway that is selected by a user.

Prices associated with any of these services are an example of information that the process retrieves in some embodiments to augment the map display. For instance, if the user taps or clicks on an indicator associated with fuel services, the process 1100 upon its return to 1115 could obtain prices for the n (5) closest fuel stations from an external source and then have these prices rendered in the map display along with the display of these fuel stations. The distance to each of the available services could also be provided in the initial display, or as a result of a further selection by the user. Likewise, availability of a service, such as the number of vacant rooms at a hotel, could be displayed. This information might be contained in one or more layers that were not previously being displayed, but are activated when the user taps or clicks upon the highway symbol. In such circumstances, the process would first return to 1110 to select the additional layers and then retrieves and displays information about the desired services in the new layers at 1115 and 1120. In some embodiments, the process displays information about a feature or a service by an indicator (e.g., a point of interest, POI, indicator) on the map along with textual data (e.g., pricing data, availability data) that can be displayed adjacent or near the indicator. In some embodiments, the process displays the textual data in response to the user's selection of the indicator for the feature or the service.

Another example of external sources that the process can use to augment the map display in response to user input includes search engines that help the process 1100 respond to search queries of the user. In response to a search conducted while in a particular display mode, the process in some embodiments filters (upon its return to 1115) the presentation of the results to the user in accordance with at least one heuristic associated with the display mode. For instance, in some embodiments, the process detects movement of the computing device, and in response to the user query, filters the presentation of the results to the user in accordance with the direction of movement. If the user query requests locations of services, the filtering can be limited to the presentation of services that are located in the general direction of movement of the computing device. The filtering can also be limited to the results that are presented in accordance with at least one factor affecting the rate of movement of the computing device. This factor can be traffic conditions in the direction of movement of the computing device.

Also, the filtering in some embodiments can suppress in a map, the content that lies beyond a predicted envelope of travel from the device's present location; the process in some embodiments computes the predicted envelope of travel based on the device's expected direction of travel and the distance the device is expected to travel in a predetermined time. The filtering can also suppress in the map, the content that does not match a content type specified by the user. By presenting the results in response to a search query on the map based on the location of the device or based on the location on the map currently being displayed, the mapping application of some embodiments serves as a geo-location web browser that allows a user to retrieve and view search results based on the locality that is being traveled or viewed. For instance, a search for "pants" can direct the application to retrieve and display nearby shops, and in some cases, prices of pants in those shops.

Figure 12:
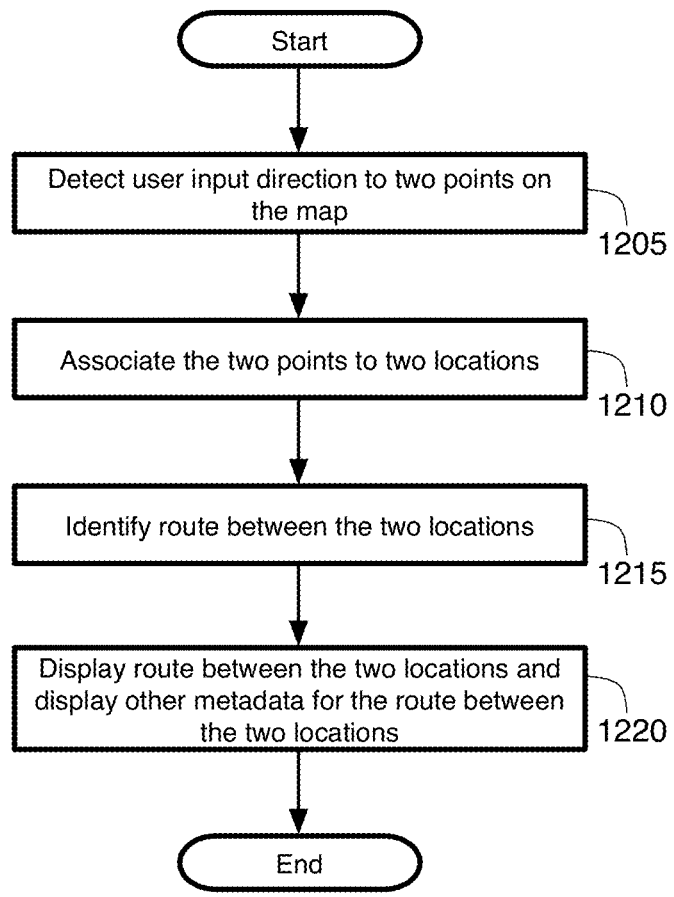
FIG. 12 conceptually illustrates a process of some embodiments for generating a route.

FIG. 12 conceptually illustrates a process 1200 of some embodiments that generates and displays a route based on a user's selection of two points on a map that is displayed on the display screen of a device. As shown in this figure, the process initially detects (at 1205) user input directed to two points on the map display. In some embodiments, a mapping application that executes on a device with a touch-sensitive screen, performs the process 1200. In some of these embodiments, the process detects the user input at 1205 when it detects a single two-point (e.g., two finger) touch operation on two locations on the screen that are displaying the map. In other embodiments, the process detects the input directed to the two points on the map through other input mechanisms, such as cursor controller, keyboard, etc. Such other input mechanisms might allow the user to identify the two points consecutively as opposed to concurrently.

After 1205, the process correlates (at 1210) the two points on the screen to two locations on the map that correspond to two locations in the physical world. In some embodiments, each point on the map is specified in terms of coordinates (e.g., latitude and longitude coordinates) that uniquely identify the point and that correlate the point to a location in the physical world. Also, for each map display, the position on the screen corresponds to a position on the map. Accordingly, based on the association between the screen coordinates and the map coordinates, and between the map coordinates and the physical world, the process can associate the two input points to two locations in the physical world.

Next, at 1215, the process identifies a route between the two locations in the physical world that it identified at 1210.

To perform this operation, the process 1200 in some embodiments uses an external source that communicatively couples to the device that executes the process. In some embodiments, the external source is a set of servers that receives the two locations from the device that executes the process 1200, generates one or more routes between the two locations, and supplies the generated route(s) to the device. The device communicatively couples to this set of servers through the Internet or other communication network in some embodiments. Instead of using an external source to generate the route, the process 1200 in other embodiments uses a route-generation engine that executes on the same device as the process 1200, in order to generate the route between two locations identified at 1210.

At 1220, the process then displays the route (that it identified at 1215) in the map display. To display the route, the process 1200 in some embodiments treats the route as another layer of information that it has to render at 1120 of the process 1100 along with the other map layers for the particular map display. The rendering of the map display based on multiple map layers will be further described below by reference to FIG. 13.

Also, at 1220, the process in some embodiments displays one or more pieces of data regarding the displayed route that the process receives or generates along with the displayed route. Such data includes metric information regarding the length of the route, and temporal data regarding estimated time to travel along the route. In some embodiments, the process 1200 does not display a route when the user selects two points on the map, but instead only provides data associated with the two points. For instance, when the user touches two points on the map through a touch-sensitive display screen of the device, the process 1200 computes the route distance between the two points, or the straight-line distance between the two points, and then presents either the route or straight-line distance to the user. As before, the process relies on external servers to compute such a distance in some embodiments, while in other embodiments it generates this distance by using a computation engine that executes on the same device.

While the process 1200 has been described by reference to numerous details, one of ordinary skill will realize that this process can be performed differently in other embodiments. For instance, in some embodiments, the process 1200 transmits the computed route or data regarding the computed route to another device. Also, in some embodiments, the process allows the user to provide a third point on the map as an intermediate route point through which any route between the two points has to travel.

Figure 13:
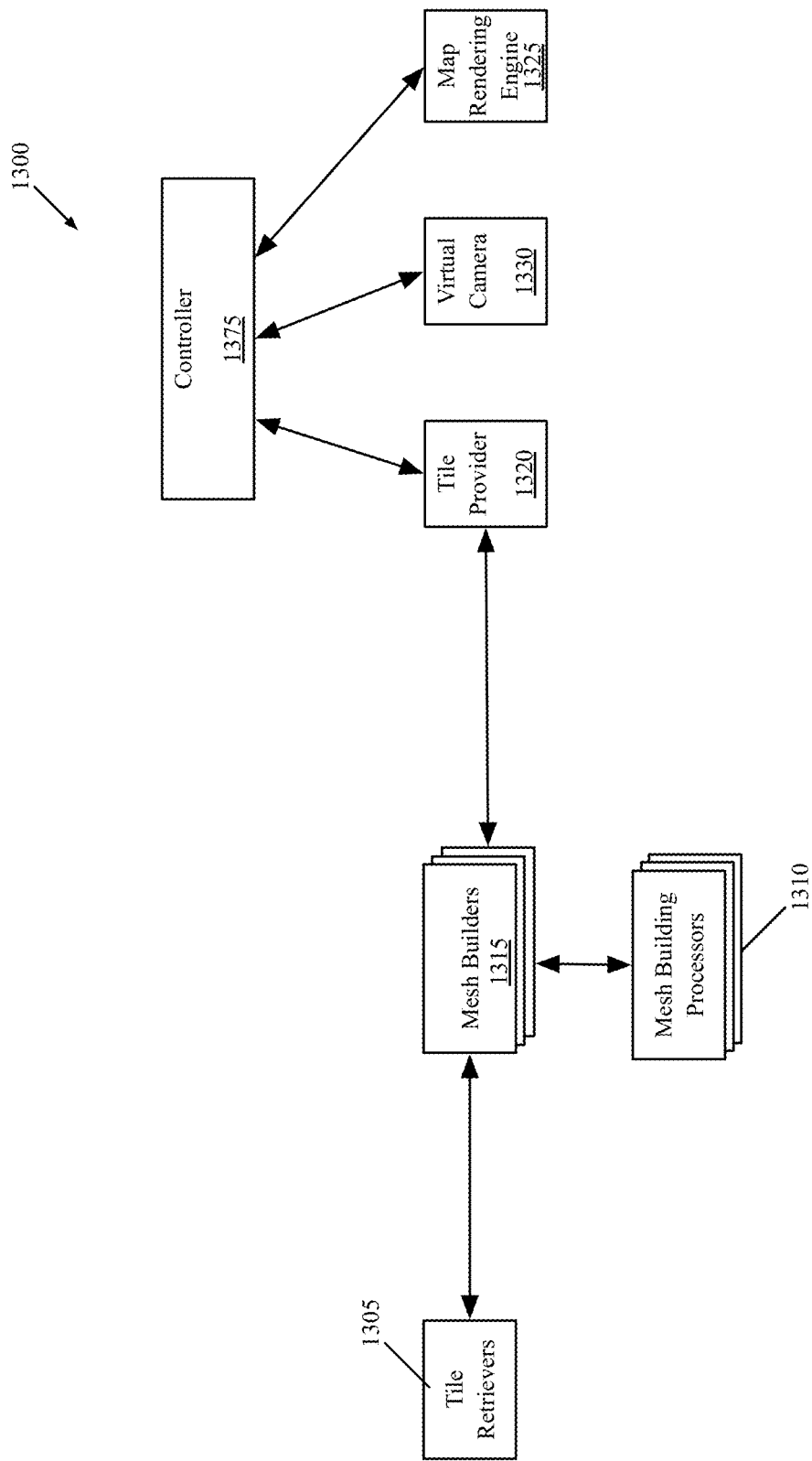
FIG. 13 illustrates the software architecture for rendering a map display from multiple map layers of information.

FIG. 13 conceptually illustrates a processing, or map rendering, pipeline 1300 performed by the mapping application of some embodiments in order to render a map for display on the display screen of a device executing the application. In other embodiments, this pipeline executes on a first device (e.g., a server) and the map display is provided to a second device that displays it. In some embodiments, the map rendering pipeline 1300 may be referred to collectively as a map rendering module.

As illustrated, the processing pipeline 1300 includes tile retrievers 1305, a set of mesh builders 1315, a set of mesh building processors 1310, a tile provider 1320, a virtual camera 1330, and a map rendering engine 1325. The tile retrievers 1305 perform various processes to retrieve map tiles in some embodiments, according to requests for the map tiles from the mesh builders 1315. Each tile contains one or more map layers of information about a portion of the map in some embodiments. In some embodiments, some of the tiles contain vector data roads and other map attributes in a vector format that needs to be processed to render the tile.

The mesh builders 1315, as will be described below, identify existing map tiles (that are stored on a mapping service server or in a cache on the device performing the processing pipeline 1300) needed to build their respective meshes. The tile retrievers 1305 receive the requests for the map tiles, determine the best location from which to retrieve the map tiles (e.g., from the mapping service, from a cache on the device) and decompress the map tiles if required.

The mesh builders 1315 (also referred to as tile sources) of some embodiments are instantiated by the tile provider 1320 in order to build different layers of view tiles. Depending on the type of map being displayed by the mapping application, the tile provider 1320 may instantiate a different number and different types of mesh builders 1315. For instance, for a satellite view map, the tile provider 1320 might only instantiate one mesh builder 1315, as the satellite map tiles of some embodiments do not contain multiple layers of data. However, some embodiments instantiate additional mesh builders to generate labels to overlay on the satellite images when the application is in a hybrid mode. For a 2D or 3D rendered vector map, some embodiments instantiate separate mesh builders 1315 to build meshes for the different map layers that include landcover polygon data (e.g., parks, bodies of water, etc.), roads, place of interest markers, point labels (e.g., labels for parks, etc.), road labels, traffic (if displaying traffic), buildings, raster data (for certain objects at certain zoom levels). Examples of such layers include the weather, nature, sightseeing, travel, traffic, commerce, and road layers described above as well as other layers of data to incorporate into the map. In some embodiments, the mesh builders build a separate mesh for each layer, while in other embodiments, one mesh can be built for two or more layers.

The mesh builders 1315 of some embodiments, receive "empty" view tiles from the tile provider 1320 and return "built" view tiles to the tile provider 1320. That is, the tile provider 1320 sends to each of the mesh builders 1315 one or more view tiles (not shown). Each of the view tiles indicates an area of the world for which to draw a mesh. Upon receiving such a view tile, a mesh builder 1315 identifies the map tiles needed from the mapping service, and sends its list to the tile retrievers 1305.

Upon receiving the tiles back from the tile retrievers 1305, the mesh builder uses vector data stored in the tiles to build a polygon mesh for the area described by the view tile. In some embodiments, the mesh builder 1315 uses several different mesh building processors 1310 to build the mesh. These functions may include a mesh generator, a triangulator, a shadow generator, and/or a texture decoder. In some embodiments, these functions (and additional mesh building functions) are available to each mesh builder, with different mesh builders 1315 using different functions. After building its mesh, each mesh builder 1315 returns its view tiles to the tile provider 1320 with its layer of the mesh filled in.

The tile provider 1320 receives from the controller 1375 a particular view (i.e., a volume, or viewing frustum) that represents the map view to be displayed (i.e., the volume visible from the virtual camera 1330). The tile provider performs any culling (e.g., identifying the surface area to be displayed in the view tile), then sends these view tiles to the mesh builders 1315. The tile provider 1320 then receives the built view tiles from the mesh builders and, in some embodiments, performs culling on the built mesh using the particular view from the virtual camera 1330 (e.g., removing surface area too far away, removing objects that will be entirely behind other objects, etc.). In some embodiments, the tile provider 1320 receives the built view tiles from the different mesh builders at different times (e.g., due to different processing times to complete more and less complicated meshes, different time elapsed before receiving the necessary map tiles from the tile retrievers 1305, etc.). Once all of the layers of view tiles have been returned, the tile provider 1320 of some embodiments puts the layers together and releases the data to the controller 1375 for rendering.

The virtual camera module 1330 generates a volume or surface for the pipeline 1300 to render, and sends this information to the controller 1375. The volume or surface generated by this module represents the field of view of a virtual camera that is capturing the 2D or 3D scene being presented in the map display. Based on a particular location and orientation from which the map will be rendered (i.e., the point in 3D space from which the user "views" the map), the virtual camera in some embodiments identifies a field of view to actually send to the tile provider 1320. In some embodiments, when the mapping application is rendering the 3D perspective view for navigation, the field of view of the virtual camera is determined according to an algorithm that generates a new virtual camera location and orientation at regular intervals based on the movement of the user device.

The controller 1375 is responsible for managing the tile provider 1320, virtual camera 1330, and map rendering engine 1325 in some embodiments. In some embodiments, multiple tile providers may actually be instantiated, and the controller puts together several view tiles (e.g., map tiles and building tiles) to create a scene that is handed off to the map rendering engine 1325.

The map rendering engine 1325 is responsible for generating a drawing to output to a display device based on the mesh tiles (not shown) sent from the virtual camera. The map rendering engine 1325 of some embodiments has several sub-processes. In some embodiments, each different type of map element is rendered by a different sub-process, with the rendering engine 1325 handling the occlusion of different layers of objects (e.g., placing labels above or behind different buildings, generating roads on top of land cover, etc.). Examples of such rendering processes include a road rendering process, a building rendering process, a label rendering process, a vegetation rendering process, a raster traffic rendering process, a raster road rendering process, a satellite rendering process, a polygon rendering process, a background raster rendering process, etc.

The operation of the rendering pipeline 1300 in some embodiments will now be described. Based on user input to view a particular map region at a particular zoom level, the virtual camera 1330 specifies a location and orientation from which to view the map region, and sends this viewing frustrum, or volume, to the controller 1375. The controller 1375 instantiates one or more tile providers. While one tile provider 1320 is shown in this figure, some embodiments allow the instantiation of multiple tile providers at once. For instance, some embodiments instantiate separate tile providers for building tiles and for map tiles.

The tile provider 1320 performs any culling necessary to generate an empty view tile identifying regions of the map for which a mesh needs to be built, and sends the empty view tile to the mesh builders 1315, which are instantiated for the different layers of the drawn map (e.g., roads, land cover, POI labels, etc.). The mesh builders 1315 use a manifest received from the mapping service that identifies the different tiles available on the mapping service server (i.e., as nodes of a quadtree). The mesh builders 1315 request specific map tiles from the tile retrievers 1305, which return the requested map tiles to the mesh builders 1315. Once a particular mesh builder 1315 has received its map tiles, it begins using the vector data stored in the map tiles to build the mesh for the view tiles sent from the tile provider 1320. After building the mesh for its map layer, the mesh builder 1315 sends the built view tile back to the tile provider 1320. The tile provider 1320 waits until it has received all of the view tiles from the various mesh builders 1315, then layers these together and sends the completed view tile to the controller 1375. The controller stitches together the returned tiles from all of its tile providers (e.g., a map view tile and a building view tile) and sends this scene to the rendering engine 1325. The map rendering engine 1325 uses the information in the map tiles to draw the scene for display.

A more detailed version of the map rendering pipeline is described in U.S. patent application Ser. No. 13/632,035, entitled "Rendering Application" and filed on Sep. 30, 2012. U.S. patent application Ser. No. 13/632,035 is incorporated herein by reference.

Figure 14:
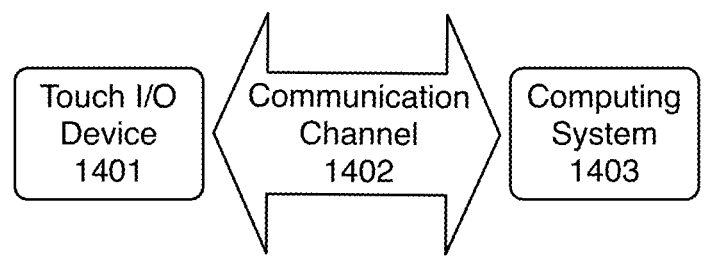
FIG. 14 is a general schematic view of a touch I/O device.

FIG. 14 illustrates that the interactive map application described above may be implemented on a touch I/O device 1401 that can receive touch input for interacting with computing system 1403 via wired or wireless communication channel 1402. Touch I/O device 1401 may be used to provide user input to computing system 1403 in lieu of or in combination with other input devices such as a keyboard, mouse, etc. One or more touch I/O devices 1401 may be used for providing user input to computing system 1403. Touch I/O device 1401 may be an integral part of computing system 1403 (e.g., touch screen on a laptop) or may be separate from computing system 1403.

Touch I/O device 1401 may include a touch sensitive panel which is wholly or partially transparent, semitransparent, non-transparent, opaque or any combination thereof. Touch I/O device 1401 may be embodied as a touch screen, touch pad, a touch screen functioning as a touch pad (e.g., a touch screen replacing the touch pad of a laptop), a touch screen or touch pad combined or incorporated with any other input device (e.g., a touch screen or touchpad disposed on a keyboard) or any multi-dimensional object having a touch sensitive surface for receiving touch input.

In one example, touch I/O device 1401 embodied as a touch screen may include a transparent and/or semitransparent touch sensitive panel partially or wholly positioned over at least a portion of a display. According to this embodiment, touch I/O device 1401 functions to display graphical data transmitted from computing system 1403 (and/or another source) and also functions to receive user input. In other embodiments, touch I/O device 1401 may be embodied as an integrated touch screen where touch sensitive components/devices are integral with display components/devices. In still other embodiments a touch screen may be used as a supplemental or additional display screen for displaying supplemental or the same graphical data as a primary display and to receive touch input.

Touch I/O device 1401 may be configured to detect the location of one or more touches or near touches on device 1401 based on capacitive, resistive, optical, acoustic, inductive, mechanical, chemical measurements, or any phenomena that can be measured with respect to the occurrences of the one or more touches or near touches in proximity to deice 1401. Software, hardware, firmware or any combination thereof may be used to process the measurements of the detected touches to identify and track one or more gestures. A gesture may correspond to stationary or nonstationary, single or multiple, touches or near touches on touch I/O device 90 1. A gesture may be performed by moving one or more fingers or other objects in a particular manner on touch I/O device 1401 such as tapping, pressing, rocking, scrubbing, twisting, changing orientation, pressing with varying pressure and the like at essentially the same time, contiguously, or consecutively. A gesture may be characterized by, but is not limited to a pinching, sliding, swiping, rotating, flexing, dragging, or tapping motion between or with any other finger or fingers. A single gesture may be performed with one or more hands, by one or more users, or any combination thereof.

Computing system 1403 may drive a display with graphical data to display a graphical user interface (GUI). The GUI may be configured to receive touch input via touch I/O device 1401. Embodied as a touch screen, touch I/O device 1401 may display the GUI. Alternatively, the GUI may be displayed on a display separate from touch I/O device 1401. The GUI may include graphical elements displayed at particular locations within the interface. Graphical elements may include but are not limited to a variety of displayed virtual input devices including virtual scroll wheels, a virtual keyboard, virtual knobs, virtual buttons, any virtual UI, and the like. A user may perform gestures at one or more particular locations on touch I/O device 1401 which may be associated with the graphical elements of the GUI. In other embodiments, the user may perform gestures at one or more locations that are independent of the locations of graphical elements of the GUI. Gestures performed on touch I/O device 1401 may directly or indirectly manipulate, control, modify, move, actuate, initiate or generally affect graphical elements such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad generally provides indirect interaction. Gestures may also affect non-displayed GUI elements (e.g., causing user interfaces to appear) or may affect other actions within computing system 1403 (e.g., affect a state or mode of a GUI, application, or operating system). Gestures may or may not be performed on touch I/O device 1401 in conjunction with a displayed cursor. For instance, in the case in which gestures are performed on a touchpad, a cursor (or pointer) may be displayed on a display screen or touch screen and the cursor may be controlled via touch input on the touchpad to interact with graphical objects on the display screen. In other embodiments in which gestures are performed directly on a touch screen, a user may interact directly with objects on the touch screen, with or without a cursor or pointer being displayed on the touch screen.

Feedback may be provided to the user via communication channel 1402 in response to or based on the touch or near touches on touch I/O device 1401. Feedback may be transmitted optically, mechanically, electrically, olfactory, acoustically, or the like or any combination thereof and in a variable or non-variable manner.

Figure 15:
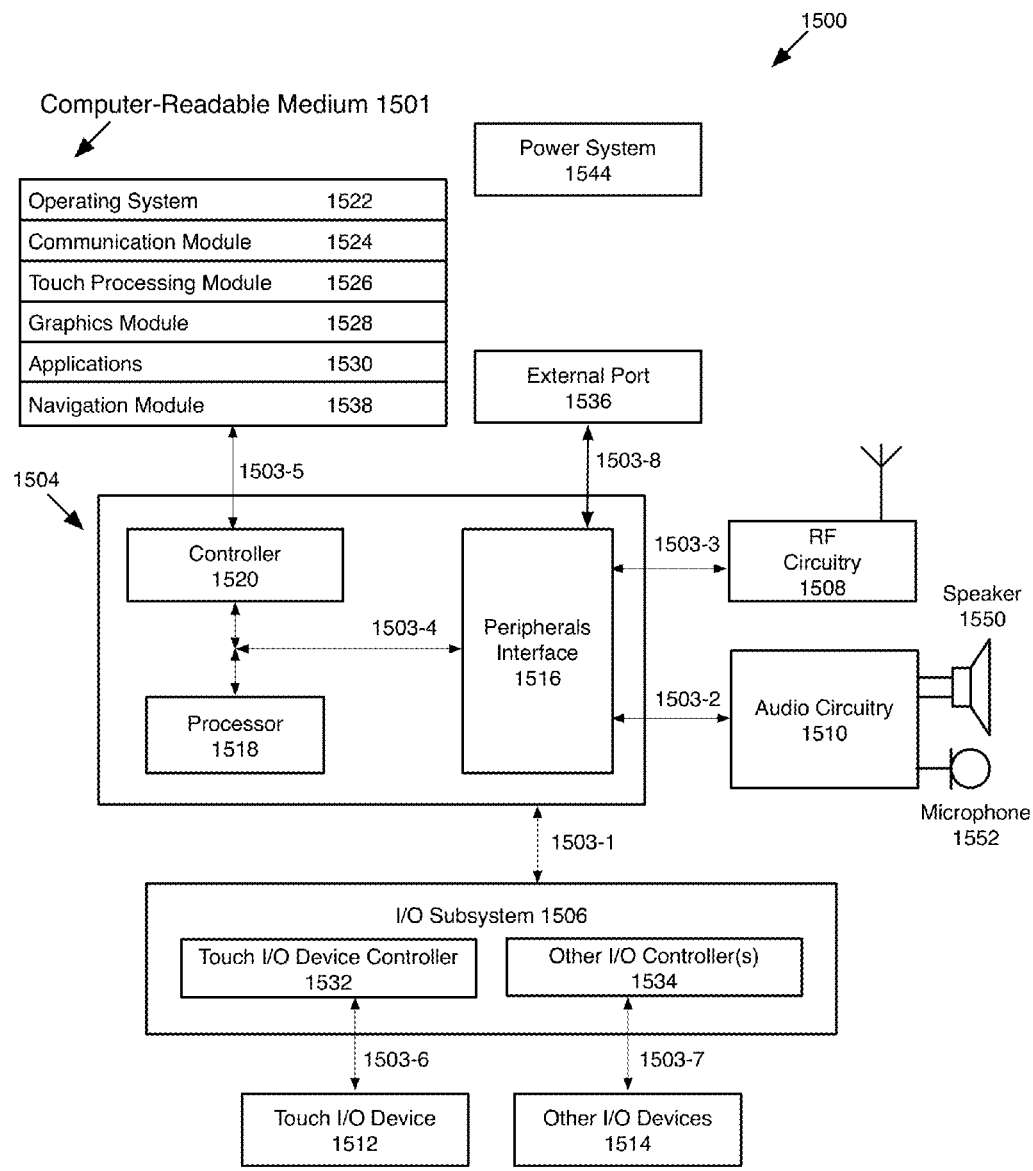
FIG. 15 is a block diagram of an illustrative system for implementing an interactive map in accordance with exemplary embodiments of the invention.

Referring to FIG. 15, a system architecture 1500 may be embodied within any portable or non-portable device, including but not limited to a communication device (e.g. mobile phone, smart phone), a multi-media device (e.g., MP3 player, TV, radio), a portable or handheld computer (e.g., tablet, netbook, laptop), a desktop computer, an All-In-One desktop, a peripheral device, or any other system or device adaptable to the inclusion of such a system architecture, including combinations of two or more of these types of devices. FIG. 15 is a block diagram of one embodiment of system 1500 that generally includes one or more computer-readable mediums 1501, processing system 1504. Input/Output (I/O) subsystem 1506, radio frequency (RF) circuitry 1508 and audio circuitry 1510. These components may be coupled by one or more communication buses or signal lines 1503.

It will be appreciated that the architecture shown in FIG. 15 is only one example architecture of system 1500, and that system 1500 could have more or fewer components than shown, or a different configuration of components. The various components shown in FIG. 15 can be implemented in hardware, software, firmware or any combination thereof, including one or more signal processing and/or application specific integrated circuits.

RF circuitry 1508 is used to send and receive information over a wireless link or network to one or more other devices and includes well-known circuitry for performing this function. RF circuitry 1508 and audio circuitry 1510 are coupled to processing system 1504 via peripherals interface 1516. Interface 1516 includes various known components for establishing and maintaining communication between peripherals and processing system 1504. Audio circuitry 1510 is coupled to audio speaker 1550 and microphone 1552 and includes known circuitry for processing voice signals received from interface 1516 to enable a user to communicate in realtime with other users. In some embodiments, audio circuitry 1510 includes a headphone jack (not shown).

Peripherals interface 1516 couples the input and output peripherals of the system to processor 1518 and computer-readable medium 1501. One or more processors 1518 communicate with one or more computer-readable mediums 1501 via controller 1520. Computer-readable medium 1501 can be any device or medium that can store code and/or data for use by one or more processors 1518. Medium 1501 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 1501 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MANs) and the like.

One or more processors 1518 run various software components stored in medium 1501 to perform various functions for system 1500. In some embodiments, the software components include operating system 1522, communication module (or set of instructions) 1524, touch processing module (or set of instructions) 1526, graphics module (or set of instructions) 1528, one or more applications (or set of instructions) 1530, and navigation module (or set of instructions) 1538. Each of these modules and above noted applications correspond to a set of instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments. In some embodiments, medium 1501 may store a subset of the modules and data structures identified above. Furthermore, medium 1501 may store additional modules and data structures not described above.

Operating system 1522 includes various procedures, sets of instructions, software components and/or drivers for controlling and managing general system tasks (e.g., memory management, storage device control, power management, etc.) and facilitates communication between various hardware and software components.

Communication module 1524 facilitates communication with other devices over one or more external ports 1536 or via RF circuitry 1508 and includes various software components for handling data received from RF circuitry 1508 and/or external port 1536.

Graphics module 1528 includes various known software components for rendering, animating and displaying graphical objects on a display surface. In embodiments in which touch I/O device 1512 is a touch sensitive display (e.g., touch screen), graphics module 1528 includes components for rendering, displaying, and animating objects on the touch sensitive display.

One or more applications 1530 can include any applications 4 installed on system 1500, including without limitation, map, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player, etc.

Touch processing module 1526 includes various software components for performing various tasks associated with touch I/O device 1512 including but not limited to receiving and processing touch input received from I/O device 1512 via touch I/O device controller 1532.

System 1500 may further include navigation module 1538 for performing the method/functions as described herein in connection with FIGS. 1-13. Navigation module 1538 may at least function to calculate navigation routes based on at least a starting point and destination point. Navigation module 1538 may also incorporate route priority preferences. A location determination capability (such as that provided by the global positioning system (GPS)) can be included as part of navigation module 1538 or as a separate module that can interact with navigation module 1538. Navigation module 1538 may also interact with touch processing module 1526 to receive user input and one or more applications 1530 (e.g., a navigation application). Module 1538 may be embodied as hardware, software, firmware, or any combination thereof. Although module 1538 is shown to reside within medium 1501, all or portions of module 1538 may be embodied within other components within system 1500 or may be wholly embodied as a separate component within system 1500.

I/O subsystem 1506 is coupled to touch I/O device 1512 and one or more other I/O devices 1514 for controlling or performing various functions. Touch I/O device 1512 communicates with processing system 1504 via touch I/O device controller 1532, which includes various components for processing user touch input (e.g., scanning hardware). One or more other input controllers 1534 receives/sends electrical signals from/to other I/O devices 1514. Other I/O devices 1514 may include physical buttons, dials, slider switches, sticks, keyboards, touch pads, additional display screens, or any combination thereof.

If embodied as a touch screen, touch I/O device 1512 displays visual output to the user in a GUI. The visual output may include text, graphics, video, and any combination thereof. Some or all of the visual output may correspond to user interface objects. Touch I/O device 1512 forms a touch-sensitive surface that accepts touch input from the user. Touch I/O device 1512 and touch screen controller 1532 (along with any associated modules and/or sets of instructions in medium 1501) detects and tracks touches or near touches (and any movement or release of the touch) on touch I/O device 1512 and converts the detected touch input into interaction with graphical objects, such as one or more user-interface objects. In the case in which device 1512 is embodied as a touch screen, the user can directly interact with graphical objects that are displayed on the touch screen. Alternatively, in the case in which device 1512 is embodied as a touch device other than a touch screen (e.g., a touch pad), the user may indirectly interact with graphical objects that are displayed on a separate display screen embodied as I/O device 1514.

Touch I/O device 1512 may be analogous to the multi-touch sensitive surface described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference.

Embodiments in which touch I/O device 1512 is a touch screen, the touch screen may use LCD (liquid crystal display) technology, LPD (light emitting polymer display) technology, OLED (organic LED), or OEL (organic electro luminescence), although other display technologies may be used in other embodiments.

Feedback may be provided by touch I/O device 1512 based on the user's touch input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

System 1500 also includes power system 1544 for powering the various hardware components and may include a power management system, one or more power sources, a recharging system, a power failure detection circuit, a power converter or inverter, a power status indicator and any other components typically associated with the generation, management and distribution of power in portable devices.

In some embodiments, peripherals interface 1516, one or more processors 1518, and memory controller 1520 may be implemented on a single chip, such as processing system 1504. In some other embodiments, they may be implemented on separate chips.

Figure 16:
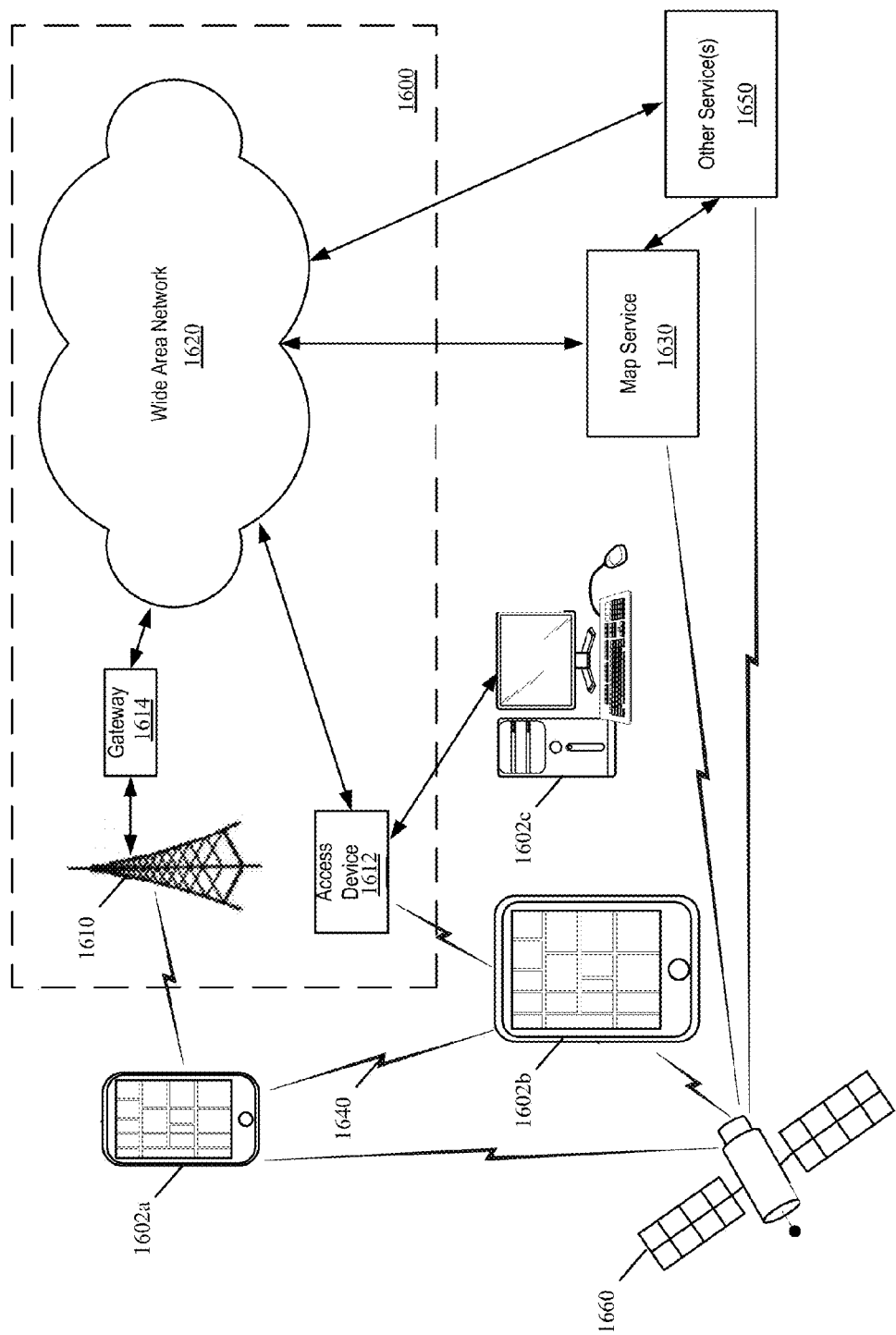
FIG. 16 illustrates a map service operating environment according to some embodiments.

Various embodiments may operate within a map service operating environment. FIG. 16 illustrates a map service operating environment according to some embodiments. A map service 1630 (also referred to as mapping service) may provide map services for one or more client devices 1602a-1602c in communication with the map service 1630 through various communication methods and protocols. A map service 1630 in some embodiments provides map information and other map-related data, such as two-dimensional map image data (e.g., aerial view of roads utilizing satellite imagery), three-dimensional map image data (e.g., traversable map with three-dimensional features, such as buildings), route and direction calculations (e.g., ferry route calculations or directions between two points for a pedestrian), real-time navigation data (e.g., turn-by-turn visual navigation data in two or three dimensions), location data (e.g., where the client device is currently located), and other geographic data (e.g., wireless network coverage, weather, traffic information, or nearby points-of-interest). In various embodiments, the map service data may include localized labels for different countries or regions. Localized labels may be utilized to present map labels (e.g., street names, city names, points of interest) in different languages on client devices. Client devices 1602a-1602c may utilize these map services by obtaining map service data. Client devices 1602a-1602c may implement various techniques to process map service data. Client devices 1602a-1602c may then provide map services to various entities, including, but not limited to, users, internal software or hardware modules, and/or other systems or devices external to the client devices 1602a-1602c.

In some embodiments, a map service is implemented by one or more nodes in a distributed computing system. Each node may be assigned one or more services or components of a map service. Some nodes may be assigned the same map service or component of a map service. A load balancing node in some embodiments distributes access or requests to other nodes within a map service. In some embodiments a map service is implemented as a single system, such as a single server. Different modules or hardware devices within a server may implement one or more of the various services provided by a map service.

A map service in some embodiments provides map services by generating map service data in various formats. In some embodiments, one format of map service data is map image data. Map image data provides image data to a client device so that the client device may process the image data (e.g., rendering and/or displaying the image data as a two-dimensional or three-dimensional map). Map image data, whether in two or three dimensions, may specify one or more map tiles. A map tile may be a portion of a larger map image. Assembling together the map tiles of a map produces the original map. Tiles may be generated from map image data, routing or navigation data, or any other map service data. In some embodiments map tiles are raster-based map tiles, with tile sizes ranging from any size both larger and smaller than a commonly-used 256 pixel by 256 pixel tile. Raster-based map tiles may be encoded in any number of standard digital image representations including, but not limited to, Bitmap (.bmp), Graphics Interchange Format (.gif), Joint Photographic Experts Group (.jpg, .jpeg, etc.), Portable Networks Graphic (.png), or Tagged Image File Format (.tiff). In some embodiments, map tiles are vector-based map tiles, encoded using vector graphics, including, but not limited to, Scalable Vector Graphics (.svg) or a Drawing File (.drw). Some embodiments also include tiles with a combination of vector and raster data. Metadata or other information pertaining to the map tile may also be included within or along with a map tile, providing further map service data to a client device. In various embodiments, a map tile is encoded for transport utilizing various standards and/or protocols, some of which are described in examples below.

In various embodiments, map tiles may be constructed from image data of different resolutions depending on zoom level. For instance, for low zoom level (e.g., world or globe view), the resolution of map or image data need not be as high relative to the resolution at a high zoom level (e.g., city or street level). For example, when in a globe view, there may be no need to render street level artifacts as such objects would be so small as to be negligible in many cases.

A map service in some embodiments performs various techniques to analyze a map tile before encoding the tile for transport. This analysis may optimize map service performance for both client devices and a map service. In some embodiments map tiles are analyzed for complexity, according to vector-based graphic techniques, and constructed utilizing complex and non-complex layers. Map tiles may also be analyzed for common image data or patterns that may be rendered as image textures and constructed by relying on image masks. In some embodiments, raster-based image data in a map tile contains certain mask values, which are associated with one or more textures. Some embodiments also analyze map tiles for specified features that may be associated with certain map styles that contain style identifiers.

Other map services generate map service data relying upon various data formats separate from a map tile in some embodiments. For instance, map services that provide location data may utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Embodiments may also receive or request data from client devices identifying device capabilities or attributes (e.g., hardware specifications or operating system version) or communication capabilities (e.g., device communication bandwidth as determined by wireless signal strength or wire or wireless network type).

A map service may obtain map service data from internal or external sources. For example, satellite imagery used in map image data may be obtained from external services, or internal systems, storage devices, or nodes. Other examples may include, but are not limited to, GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

Various embodiments of a map service may respond to client device requests for map services. These requests may be for a specific maps or portions of a map. Some embodiments format requests for a map as requests for certain map tiles. In some embodiments, requests also supply the map service with starting locations (or current locations) and destination locations for a route calculation. A client device may also request map service rendering information, such as map textures or style sheets. In at least some embodiments, requests are also one of a series of requests implementing turn-by-turn navigation. Requests for other geographic data may include, but are not limited to, requests for current location, wireless network coverage, weather, traffic information, or nearby points-of-interest.

A map service, in some embodiments, analyzes client device requests to optimize a device or map service operation. For instance, a map service may recognize that the location of a client device is in an area of poor communications (e.g., weak wireless signal) and send more map service data to supply a client device in the event of loss in communication or send instructions to utilize different client hardware (e.g., orientation sensors) or software (e.g., utilize wireless location services or Wi-Fi positioning instead of GPS-based services). In another example, a map service may analyze a client device request for vector-based map image data and determine that raster-based map data better optimizes the map image data according to the image's complexity. Embodiments of other map services may perform similar analysis on client device requests and, as such, the above examples are not intended to be limiting.

Various embodiments of client devices (e.g., client devices 1602a-1602c) are implemented on different portable-multifunction device types. Client devices 1602a-1602c utilize map service 1630 through various communication methods and protocols. In some embodiments, client devices 1602a-1602c obtain map service data from map service 1630. Client devices 1602a-1602c request or receive map service data. Client devices 1602a-1602c then process map service data (e.g., render and/or display the data) and may send the data to another software or hardware module on the device or to an external device or system.

A client device, according to some embodiments, implements techniques to render and/or display maps. These maps may be requested or received in various formats, such as map tiles described above. A client device may render a map in two-dimensional or three-dimensional views. Some embodiments of a client device display a rendered map and allow a user, system, or device providing input to manipulate a virtual camera in the map, changing the map display according to the virtual camera's position, orientation, and field-of-view. Various forms and input devices are implemented to manipulate a virtual camera. In some embodiments, touch input, through certain single or combination gestures (e.g., touch-and-hold or a swipe) manipulate the virtual camera. Other embodiments allow manipulation of the device's physical location to manipulate a virtual camera. For instance, a client device may be tilted up from its current position to manipulate the virtual camera to rotate up. In another example, a client device may be tilted forward from its current position to move the virtual camera forward. Other input devices to the client device may be implemented including, but not limited to, auditory input (e.g., spoken words), a physical keyboard, mouse, and/or a joystick.

Some embodiments provide various visual feedback to virtual camera manipulations, such as displaying an animation of possible virtual camera manipulations when transitioning from two-dimensional map views to three-dimensional map views. Some embodiments also allow input to select a map feature or object (e.g., a building) and highlight the object, producing a blur effect that maintains the virtual camera's perception of three-dimensional space.

In some embodiments, a client device implements a navigation system (e.g., turn-by-turn navigation). A navigation system provides directions or route information, which may be displayed to a user. Some embodiments of a client device request directions or a route calculation from a map service. A client device may receive map image data and route data from a map service. In some embodiments, a client device implements a turn-by-turn navigation system, which provides real-time route and direction information based upon location information and route information received from a map service and/or other location system, such as a Global Positioning Satellite (GPS). A client device may display map image data that reflects the current location of the client device and update the map image data in real-time. A navigation system may provide auditory or visual directions to follow a certain route.

A virtual camera is implemented to manipulate navigation map data according to some embodiments. In some embodiments, the client devices allow the device to adjust the virtual camera display orientation to bias toward the route destination. Some embodiments also allow the virtual camera to navigate turns by simulating the inertial motion of the virtual camera.

Client devices implement various techniques to utilize map service data from map service. Some embodiments implement some techniques to optimize rendering of two-dimensional and three-dimensional map image data. In some embodiments, a client device locally stores rendering information. For instance, a client stores a style sheet, which provides rendering directions for image data containing style identifiers. In another example, common image textures may be stored to decrease the amount of map image data transferred from a map service. Client devices in different embodiments implement various modeling techniques to render two-dimensional and three-dimensional map image data, examples of which include, but are not limited to: generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data. In some embodiments, the client devices also order or prioritize map service data in certain techniques. For instance, a client device detects the motion or velocity of a virtual camera, which if exceeding certain threshold values, lower-detail image data is loaded and rendered for certain areas. Other examples include: rendering vector-based curves as a series of points, preloading map image data for areas of poor communication with a map service, adapting textures based on display zoom level, or rendering map image data according to complexity.

In some embodiments, client devices communicate utilizing various data formats separate from a map tile. For instance, some client devices implement Assisted Global Positioning Satellites (A-GPS) and communicate with location services that utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Client devices may also receive GPS signals directly. Embodiments may also send data, with or without solicitation from a map service, identifying the client device's capabilities or attributes (e.g., hardware specifications or operating system version) or communication capabilities (e.g., device communication bandwidth as determined by wireless signal strength or wire or wireless network type).

FIG. 16 illustrates one possible embodiment of an operating environment 1600 for a map service 1630 and client devices 1602a-1602c. In some embodiments, devices 1602a, 1602b, and 1602c communicate over one or more wire or wireless networks 1610. For example, wireless network 1610, such as a cellular network, can communicate with a wide area network (WAN) 1160, such as the Internet, by use of gateway 1614. A gateway 1614 in some embodiments provides a packet oriented mobile data service, such as General Packet Radio Service (GPRS), or other mobile data service allowing wireless networks to transmit data to other networks, such as wide area network 1160. Likewise, access device 1612 (e.g., IEEE 802.11g wireless access device) provides communication access to WAN 1160. Devices 1602a and 1602b can be any portable electronic or computing device capable of communicating with a map service. Device 1602c can be any non-portable electronic or computing device capable of communicating with a map service.

In some embodiments, both voice and data communications are established over wireless network 1610 and access device 1612. For instance, device 1602a can place and receive phone calls (e.g., using voice over Internet Protocol (VoIP) protocols), send and receive e-mail messages (e.g., using Simple Mail Transfer Protocol (SMTP) or Post Office Protocol 3 (POP3)), and retrieve electronic documents and/ or streams, such as web pages, photographs, and videos, over wireless network 1610, gateway 1614, and WAN 1160 (e.g., using Transmission Control Protocol/Internet Protocol (TCP/IP) or User Datagram Protocol (UDP)). Likewise, in some implementations, devices 1602b and 1602c can place and receive phone calls, send and receive e-mail messages, and retrieve electronic documents over access device 1612 and WAN 1160. In various embodiments, any of the illustrated client devices may communicate with map service 1630 and/or other service(s) 1650 using a persistent connection established in accordance with one or more security protocols, such as the Secure Sockets Layer (SSL) protocol or the Transport Layer Security (TLS) protocol.

Devices 1602a and 1602b can also establish communications by other means. For example, wireless device 1602a can communicate with other wireless devices (e.g., other devices 1602b, cell phones, etc.) over the wireless network 1610. Likewise devices 1602a and 1602b can establish peer-to-peer communications 1640 (e.g., a personal area network) by use of one or more communication subsystems, such as Bluetooth® communication from Bluetooth Special Interest Group, Inc. of Kirkland, Wash. Device 1602c can also establish peer to peer communications with devices 1602a or 1602b (not shown). Other communication protocols and topologies can also be implemented. Devices 1602a and 1602b may also receive Global Positioning Satellite (GPS) signals from GPS satellites 1660.

Devices 1602a, 1602b, and 1602c can communicate with map service 1630 over one or more wired and/or wireless networks, 1612 or 1610. For instance, map service 1630 can provide map service data to rendering devices 1602a, 1602b, and 1602c. Map service 1630 may also communicate with other services 1650 to obtain data to implement map services. Map service 1630 and other services 1650 may also receive GPS signals from GPS satellites 1660.

In various embodiments, map service 1630 and/or other service(s) 1650 are configured to process search requests from any of the client devices. Search requests may include but are not limited to queries for businesses, addresses, residential locations, points of interest, or some combination thereof. Map service 1630 and/or other service(s) 1650 may be configured to return results related to a variety of parameters including but not limited to a location entered into an address bar or other text entry field (including abbreviations and/or other shorthand notation), a current map view (e.g., user may be viewing one location on the multifunction device while residing in another location), current location of the user (e.g., in cases where the current map view did not include search results), and the current route (if any). In various embodiments, these parameters may affect the composition of the search results (and/or the ordering of the search results) based on different priority weightings. In various embodiments, the search results that are returned may be a subset of results selected based on specific criteria including but not limited to a quantity of times the search result (e.g., a particular point of interest) has been requested, a measure of quality associated with the search result (e.g., highest user or editorial review rating), and/or the volume of reviews for the search results (e.g., the number of times the search result has been review or rated).

In various embodiments, map service 1630 and/or other service(s) 1650 are configured to provide auto-complete search results that are displayed on the client device, such as within the mapping application. For instance, auto-complete search results may populate a portion of the screen as the user enters one or more search keywords on the multifunction device. In some cases, this feature may save the user time as the desired search result may be displayed before the user enters the full search query. In various embodiments, the auto complete search results may be search results found by the client on the client device (e.g., bookmarks or contacts), search results found elsewhere (e.g., from the Internet) by map service 1630 and/or other service(s) 1650, and/or some combination thereof. As is the case with commands, any of the search queries may be entered by the user via voice or through typing. The multifunction device may be configured to display search results graphically within any of the map display described herein. For instance, a pin or other graphical indicator may specify locations of search results as points of interest. In various embodiments, responsive to a user selection of one of these points of interest (e.g., a touch selection, such as a tap), the multifunction device is configured to display additional information about the selected point of interest including but not limited to ratings, reviews or review snippets, hours of operation, store status (e.g., open for business, permanently closed, etc.), and/or images of a storefront for the point of interest. In various embodiments, any of this information may be displayed on a graphical information card that is displayed in response to the user's selection of the point of interest.

In various embodiments, map service 1630 and/or other service(s) 1650 provide one or more feedback mechanisms to receive feedback from client devices 1602a-1602c. For instance, client devices may provide feedback on search results to map service 1630 and/or other service(s) 1650 (e.g., feedback specifying ratings, reviews, temporary or permanent business closures, errors etc.); this feedback may be used to update information about points of interest in order to provide more accurate or more up-to-date search results in the future. In some embodiments, map service 1630 and/or other service(s) 1650 may provide testing information to the client device (e.g., an A/B test) to determine which search results are best. For instance, at random intervals, the client device may receive and present two search results to a user and allow the user to indicate the best result. The client device may report the test results to map service 1630 and/or other service(s) 1650 to improve future search results based on the chosen testing technique, such as an A/B test technique in which a baseline control sample is compared to a variety of single-variable test samples in order to improve results.

It will be appreciated by those of ordinary skill in the art that the disclosed interactive map can be embodied in other specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced therein.

The invention claimed is:

1. A method for displaying a map on a computing device, comprising:

storing the map and information to be displayed on the map in a memory of the computing device, the stored information comprising one or more layers of information, including one or more first layers of information and one or more second layers of information, wherein each layer contains a respective type of information;

displaying the map and the one or more layers of information superimposed upon the map on a display of the computing device;

associating the one or more layers of information with a plurality of display modes each corresponding to a different topic of interest, wherein the plurality of display modes are different and distinct from the one or more layers;

receiving a single user selection of a first display mode of the plurality of display modes, where the first display mode is associated with multiple first features in at least two layers of the one or more layers of information, wherein multiple second features in the at least two layers are not associated with the first display mode;

in response to receiving the single user selection of the first display mode corresponding to a topic of interest, automatically and without human intervention:

emphasizing a value of at least one first display parameter for the multiple first features in the at least two layers of information, relative to a default value for the at least one first display parameter;

suppressing a value of at least one second display parameter for the multiple second features in the at least two layers of information, relative to a default value for the at least one second display parameter;

displaying a user interface via which the user is enabled to assign a numerical priority value to each of the plurality of display modes; and in response to a user input indicating a desire to switch from the first display mode to a second display mode, displaying the one or more layers of information associated with a display mode whose numerical priority value is immediately adjacent the numerical priority value of the first display mode.

2. The method of claim 1 further comprising the steps of:
receiving search query results responsive to a search query;
determining a subset of the search results that are relevant to the first display mode; and
displaying the subset of the search results over the map.

3. The method of claim 1, wherein the first parameter is opacity of displayed map features associated with the layer.

4. The method of claim 1, wherein the first parameter is color saturation of displayed map features associated with the layer.

5. The method of claim 1, wherein, for at least one of the plurality of display modes, the information in a layer associated with that mode includes locations of services related to the corresponding topic.

6. The method of claim 5, wherein the information in the layer associated with the display mode further includes textual data pertaining to at least one of the services.

7. The method of claim 6, wherein the location of a service is identified by an indicator on the map, and said textual data is displayed in response to a user input directed to the indicator on the map.

8. The method of claim 1, further including displaying identifications of the plurality of display modes, and in response to user selection of a plurality of the identifications, creating a custom display mode comprising a combination of the one or more layers of information associated with the plurality of display modes.

9. The method of claim 8, wherein the custom display mode comprises a map containing a composite of the layers of information associated with the plurality of display modes.

10. The method of claim 8, wherein the custom display mode comprises a plurality of maps that are displayed concurrently, with each map corresponding to a respective one of the plurality of display modes.

11. The method of claim 8, further including displaying a user interface that enables the user to select one of the following views for the custom display mode:
a map containing a composite of the sets of information associated with the plurality of display modes, and
a plurality of maps that are displayed concurrently, with each map corresponding to a respective one of plurality of display modes.

12. The method of claim 1, wherein the computing device includes a touch input device, and the user input is a directional swipe of the touch input device.

13. The method of claim 1, wherein the user input comprises activation of a directional control element displayed in conjunction with the map.

14. The method of claim 1, further including displaying the first display mode having the highest numerical priority value upon initial display of the map.

15. The method of claim 1, further including, upon receipt of results in response to a search conducted while the map is in the first display mode, filtering the presentation of the results to the user in accordance with at least one heuristic associated with the first display mode.

16. The method of claim 1, further including detecting movement of the computing device, and in response to entry of a user query, filtering the presentation of the results to the user in accordance with the direction of movement of the computing device.

17. The method of claim 16, wherein, if the user query requests locations of services, the filtering comprises limiting the presentation to services that are located in the general direction of movement of the computing device.

18. The method of claim 16, wherein the filtering comprises limiting the results that are presented in accordance with at least one factor affecting the rate of movement of the computing device.

19. The method of claim 1, wherein the multiple first features in the at least two layers of the one or more layers of information are located in a first layer of the at least two layers and a second layer of the at least two layers, wherein the first layer is distinct from the second layer.

20. The method of claim 1, wherein the multiple first features are of different types and displayed on the map using different symbols.

21. A computing device, comprising:
a computer-readable memory configured to store a map and information to be displayed on the map in a memory of the computing device, the stored information comprising one or more layers of information, including one or more first layers of information and one or more second layers of information, wherein each layer contains a respective type of information;
a display device; and
a processor configured to
display, on the display device, the map and the one or more layers of information superimposed upon the map on a display of the computing device;
associate the one or more layers of information with a plurality of display modes each corresponding to a different topic of interest, wherein the plurality of display modes are different and distinct from the one or more layers;
receive a single user selection of a first display mode of the plurality of display modes, where the first display mode is associated with multiple first features in at least two layers of the one or more layers of information, wherein multiple second features in the at least two layers are not associated with the first display mode;

in response to receiving the single user selection of the first display mode corresponding to a topic of interest, automatically and without human intervention:

emphasize a value of at least one first display parameter for the multiple first features in the at least two layers of information, relative to a default value for the at least one first display parameter;

suppress a value of at least one second display parameter for the multiple second features in the at least two layers of information, relative to a default value for the at least one second display parameter;

display a user interface via which the user is enabled to assign a numerical priority value to each of the plurality of display modes; and in response to a user input indicating a desire to switch from the first display mode to a second display mode, display the one or more layers of information associated with a display mode whose numerical priority value is immediately adjacent the numerical priority value of the first display mode.

22. The computing device of claim 21 wherein the processor is further configured to:

receive search query results responsive to a search query;

determine a subset of the search results that are relevant to the first display mode; and display the subset of the search results over the map.

23. The computing device of claim 21, wherein at least one of the one or more layers of information contains a reference to an external resource, and wherein the processor is responsive to the selection of one of the plurality of selected display modes associated with the at least one of the one of more layers of information to access data from the referenced resource.

24. A non-transitory computer-readable medium having stored thereon program instructions which, when executed by a computing device, cause the computing device to perform the following operations:

store a map and information to be displayed on the map in a memory of the computing device, the stored information comprising one or more layers of information, including one or more first layers of information and one or more second layers of information, wherein each layer contains a respective type of information;

display the map and the one or more layers of information superimposed upon the map on a display of the computing device;

associate the one or more layers of information with a plurality of display modes each corresponding to a different topic of interest, wherein the plurality of display modes are different and distinct from the one or more layers;

receive a single user selection of a first display mode of the plurality of display modes, where the first display mode is associated with multiple first features in at least two layers of the one or more layers of information, wherein multiple second features in the at least two layers are not associated with the first display mode;

in response to receiving the single user selection of the first display mode corresponding to a topic of interest, automatically and without human intervention:

emphasize a value of at least one first display parameter for the multiple first features in the at least two layers of information, relative to a default value for the at least one first display parameter;

suppress a value of at least one second display parameter for the multiple second features in the at least two layers of information, relative to a default value for the at least one second display parameter;

display a user interface via which the user is enabled to assign a numerical priority value to each of the plurality of display modes; and in response to a user input indicating a desire to switch from the first display mode to a second display mode, display the one or more layers of information associated with a display mode whose numerical priority value is immediately adjacent the numerical priority value of the first display mode.

25. The computer readable medium of claim 24, wherein the instructions further cause the computing device to:

receive search query results responsive to a search query;

determine a subset of the search results that are relevant to the first display mode; and display the subset of the search results over the map.

* * * * *